United States Patent
Shinto et al.

(10) Patent No.: US 9,651,770 B2
(45) Date of Patent: May 16, 2017

(54) INTERFERENCE FILTER, OPTICAL FILTER DEVICE, OPTICAL MODULE, AND ELECTRONIC APPARATUS

(71) Applicant: Seiko Epson Corporation, Tokyo (JP)

(72) Inventors: Susumu Shinto, Shimosuwa (JP); Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 130 days.

(21) Appl. No.: 14/486,283

(22) Filed: Sep. 15, 2014

(65) Prior Publication Data
US 2015/0092272 A1    Apr. 2, 2015

(30) Foreign Application Priority Data
Sep. 27, 2013   (JP) ................................. 2013-201047

(51) Int. Cl.
| | |
|---|---|
| *G02B 26/00* | (2006.01) |
| *G01J 3/26* | (2006.01) |
| *G01J 3/51* | (2006.01) |
| *G02B 5/28* | (2006.01) |
| *G02B 1/11* | (2015.01) |

(52) U.S. Cl.
CPC .............. *G02B 26/001* (2013.01); *G01J 3/26* (2013.01); *G01J 3/51* (2013.01); *G02B 1/11* (2013.01); *G02B 5/28* (2013.01); *G02B 5/285* (2013.01)

(58) Field of Classification Search
CPC ..... G02B 26/001; G02B 26/0841; G01J 3/26; G01J 3/51; G01J 3/02
USPC ........ 359/577–590, 237–239, 290–291, 295; 356/450–451, 454, 480, 505, 506, 519
See application file for complete search history.

(56) References Cited

U.S. PATENT DOCUMENTS

| | | | |
|---|---|---|---|
| 6,813,291 B2* | 11/2004 | Wang | G01J 3/26 372/43.01 |
| 7,294,280 B2 | 11/2007 | Sherrer et al. | |
| 2010/0302660 A1 | 12/2010 | Hirokubo et al. | |
| 2011/0199617 A1* | 8/2011 | Shinto | G02B 26/001 356/519 |
| 2011/0222158 A1* | 9/2011 | Sano | G02B 6/29361 359/584 |
| 2011/0249315 A1 | 10/2011 | Tao et al. | |
| 2012/0188646 A1* | 7/2012 | Sano | G01J 3/26 359/578 |
| 2012/0257280 A1 | 10/2012 | Sano et al. | |

(Continued)

FOREIGN PATENT DOCUMENTS

| | | |
|---|---|---|
| JP | 2002-148528 A | 5/2002 |
| JP | 2002-277758 A | 9/2002 |

(Continued)

OTHER PUBLICATIONS

Extended European Search Report for Application No. EP 14 18 6596 dated Feb. 13, 2015 (6 pages).

*Primary Examiner* — Scott J Sugarman
*Assistant Examiner* — Kristina Deherrera
(74) *Attorney, Agent, or Firm* — Harness, Dickey & Pierce, P.L.C.

(57) ABSTRACT

A variable wavelength interference filter includes a stationary substrate, a stationary reflecting film disposed on the entire surface of the stationary substrate opposed to a movable substrate, and formed of a multilayer film, a movable reflecting film opposed to the stationary reflecting film, and a first mirror electrode disposed on the stationary reflecting film.

18 Claims, 15 Drawing Sheets

(56) References Cited

U.S. PATENT DOCUMENTS

2013/0083399 A1    4/2013  Hirokubo et al.
2013/0214123 A1    8/2013  Shinto

FOREIGN PATENT DOCUMENTS

| | | |
|---|---|---|
| JP | 2004-348136 A | 12/2004 |
| JP | 2011-008225 A | 1/2011 |
| JP | 2012-108220 A | 6/2012 |
| JP | 2013-033257 A | 2/2013 |
| JP | 2013-167789 A | 8/2013 |

\* cited by examiner

INTERFERENCE FILTER, OPTICAL FILTER DEVICE, OPTICAL MODULE, AND ELECTRONIC APPARATUS

BACKGROUND

1. Technical Field

The present invention relates to an interference filter, an optical filter device, an optical module, and an electronic apparatus.

2. Related Art

A known interference filter has a pair of reflecting films opposed to each other and a gap dimension between the reflecting films is varied to thereby take out light having a predetermined wavelength (see, e.g., JP-A-2002-277758).

In the interference filter described in JP-A-2002-277758, a pair of reflecting films are disposed respectively on surfaces of two optical substrates opposed to each other, and a capacitance electrode is disposed on an outer side of the reflecting film of each of the optical substrates.

Incidentally, in the interference filter described in JP-A-2002-277758, a metal film and a dielectric multilayer film are recited as examples of the reflecting film. Here, in the case of using the dielectric multilayer film as the reflecting film, generally, a lift-off pattern is provided to the optical substrate, then the dielectric multilayer film is formed, and then lift-off is performed to thereby form the reflecting film at a predetermined position of the optical substrate.

However, in the case of forming the dielectric multilayer film using such a lift-off process, since it is necessary to perform the process of forming the lift-off pattern and the lift-off process, there is a problem that the production efficiency is degraded. Further, the side surface (end surface) of the dielectric multilayer film formed by the lift-off process becomes perpendicular to an upper surface corresponding to the optical substrate. On this occasion, in the case of, for example, providing the reflecting film with the electrode, and forming a leader line of the electrode to the outer peripheral portion of the optical substrate, there also occurs a risk that the leader line is broken on the end surface of the dielectric multilayer film.

SUMMARY

An advantage of some aspects of the invention is to provide an interference filter, an optical filter device, an optical module, and an electronic apparatus achieving an improvement in production efficiency and capable of reducing the risk of breaking.

An interference filter according to an aspect of the invention includes a substrate, a first reflecting film disposed on one surface of the substrate, and formed of a plurality of layers, a second reflecting film opposed to the substrate, and an electrode disposed on the first reflecting film, and the first reflecting film includes a region opposed to the second reflecting film, and is disposed in an area extending from the region to an outer circumferential edge of the substrate.

In this aspect of the invention, the first reflecting film includes a region opposed to the second reflecting film, and is disposed so as to extend to an outer circumferential edge of the substrate. In other words, the first reflecting film formed of a plurality of layers is disposed on the entire area of one surface of the substrate, and the electrode is disposed on the first reflecting film. In such a configuration, simplification of the forming process of the first reflecting film can be achieved compared to the case of forming the first reflecting film at predetermined positions. Specifically, in the case of disposing the reflecting film including the dielectric multilayer film to predetermined positions of the substrate, it becomes necessary to perform a process of forming a lift-off pattern to the forming positions of the reflecting film, then forming the reflecting film of the dielectric multilayer film, and then performing the lift-off process to remove the unwanted portions. In contrast, according to this aspect of the invention, the formation of the lift-off pattern and the lift-off process becomes unnecessary, and the production efficiency is improved.

Further, in the case of disposing the electrode on the outermost surface of the reflecting film formed using the lift-off process as described above, and then forming a connection electrode for applying an electrical signal to the electrode so as to extend to the outer circumference of the substrate, since it is necessary to form the connection electrode or the electrode on the end surface of the dielectric multilayer film, the risk of breaking increases. In contrast, according to this aspect of the invention, the electrode is disposed on the first reflecting film, and it is not necessary to form the electrode or the connection electrode along the end surface of the first reflecting film, and therefore, the risk of breaking described above does not occur. Further, even in the case in which unevenness (an edge or a steep slope due to a step or the like) exists on the surface of the substrate due to a manufacturing process such as etching performed on the substrate, by forming the first reflecting film formed of a plurality of layers on the surface of the substrate, the surface of the first reflecting film becomes a slope having a gently curved shape. Therefore, by forming the electrode on the first reflecting film, the risk of breaking described above can be suppressed.

In the interference filter according to the aspect of the invention described above, it is preferable that the first reflecting film is provided with a first region opposed to the second reflecting film via a predetermined gap, and the electrode is provided with a mirror electrode having a light transmissive property and overlapping the first region, and a mirror connection electrode disposed so as to extend from an outer circumferential edge of the mirror electrode to a predetermined position in the first reflecting film and outside the first region in a planar view in which the substrate is viewed from a normal direction of the surface on which the first reflecting film is disposed.

With this configuration, the electrode is provided with the mirror electrode disposed in the first region of the first reflecting film on which the second reflecting film is overlapped, and the mirror connection electrode for achieving the wiring connection to the mirror electrode. In such a configuration, by connecting the mirror connection electrode to a reference potential circuit (e.g., a ground circuit), charging in the first region of the first reflecting film can be prevented.

In the interference filter according to the aspect of the invention described above, it is preferable that there is further included a stress-canceling film, which is adapted to cancel out a film stress of the first reflecting film, and which is disposed on the other surface of the substrate on an opposite side to the surface on which the first reflecting film is disposed, and which is disposed in an area overlapping the first reflecting film in a planar view viewed from a normal direction of the other surface.

In the aspect of the invention, since the first reflecting film formed of a plurality of layers is disposed on the entire area of one surface of the substrate as described above, the film stress of the first reflecting film also increases. In this regard, in the configuration described above, the stress-canceling film for canceling the film stress of the first reflecting film is disposed in the region overlapping the first reflecting film in the planar view on the surface on the opposite side of the substrate, namely on the entire surface of the substrate on the opposite side to the surface on which the first reflecting film is disposed. Therefore, the deflection of the substrate due to the film stress of the first reflecting film can be suppressed, and thus, the deterioration of the spectral characteristics of the interference filter due to the deflection of the first reflecting film can be suppressed.

In the interference filter according to the aspect of the invention described above, it is preferable that the stress-canceling film is an antireflection film.

With this configuration, the stress-canceling film constitutes an antireflection film. Therefore, reflection and attenuation of the light entering the interference filter or the light emitted from the interference filter can be suppressed, and thus, attenuation of the light intensity of the light emitted from the interference filter can be suppressed.

In the interference filter according to the aspect of the invention described above, it is preferable that the interference filter further includes a second substrate opposed to the substrate, and provided with the second reflecting film, the second reflecting film is formed of a plurality of layers, and includes a region of the second substrate opposed to the first reflecting film, and is disposed in an area extending from the region to an outer circumferential edge of the second substrate, and a second electrode is disposed on the second reflecting film.

With this configuration, there is provided the second substrate opposed to the substrate, and the second reflecting film is disposed on the entire surface of the second substrate opposed to the substrate (referred to as a first substrate in some cases in order to avoid confusion with the second substrate) on which the first reflecting film is disposed. Therefore, similarly to the aspect of the invention described above, the surface of the second reflecting film also becomes a smooth surface, and even in the case of disposing the second electrode on the second reflecting film, the risk of breaking of the second electrode can be suppressed. Further, since the process of forming the lift-off pattern and the lift-off process can be made unnecessary in the formation of the second reflecting film, which is formed of the multilayer film, the improvement of production efficiency can also be achieved.

In the interference filter according to the aspect of the invention described above, it is preferable that the second reflecting film is provided with a second region opposed to the first reflecting film via a predetermined gap, and the second electrode is provided with a second mirror electrode having a light transmissive property and overlapping the second region, and a second mirror connection electrode disposed so as to extend from an outer circumferential edge of the second mirror electrode to a predetermined position in the second reflecting film and outside the second region in a planar view in which the second substrate is viewed from a normal direction of the surface on which the second reflecting film is disposed.

With this configuration, the second electrode is provided with the second mirror electrode disposed in the second region of the second reflecting film on which the first reflecting film is overlapped, and the second mirror connection electrode for achieving the wiring connection to the second mirror electrode. In such a configuration, by connecting the second mirror connection electrode to a reference potential circuit (e.g., a ground circuit), charging in the second region of the second reflecting film can be prevented.

Further, in the case in which the mirror electrode and the mirror connection electrode (referred to as a first mirror electrode and a first mirror connection electrode in some cases in order to avoid confusion with the second mirror electrode and the second mirror connection electrode, respectively) are disposed on the first reflecting film, it is possible to adopt a configuration of connecting the first mirror connection electrode and the second mirror electrode to each other, and in this case, the Coulomb force can be inhibited from occurring between the first region of the first reflecting film and the second region of the second reflecting film. Further, in this case, by detecting the capacitance between the first mirror electrode and the second mirror electrode, detection of the gap dimension between the reflecting films becomes possible.

In the interference filter according to the aspect of the invention described above, it is preferable that the first reflecting film is provided with a first region opposed to the second reflecting film via a predetermined gap, the second reflecting film is provided with a second region opposed to the first region via the predetermined gap, the electrode is provided with a first drive electrode disposed outside the first region, and a first drive connection electrode disposed so as to extend from an outer circumferential edge of the first drive electrode to a predetermined position in the first reflecting mirror outside the first region in a planar view in which the substrate is viewed from a normal direction of the surface on which the first reflecting film is disposed, and the second electrode is provided with a second drive electrode disposed outside the second region, and a second drive connection electrode disposed so as to extend from an outer circumferential edge of the second drive electrode to a predetermined position in the second reflecting mirror outside the second region in a planar view in which the second substrate is viewed from a normal direction of the surface on which the second reflecting film is disposed.

With this configuration, the first drive electrode is disposed on the first reflecting film and outside the first region, and the second drive electrode opposed to the first drive electrode is disposed on the second reflecting film and outside the second region. According to this configuration, by applying a drive voltage between the first drive electrode and the second drive electrode, the gap dimension between the first reflecting film (the first region) and the second reflecting film (the second region) can be changed in accordance with the voltage applied.

In the configuration described above, by applying the voltage between the first drive electrode and the second drive electrode, the gap dimension between the first region of the first reflecting film and the second region of the second reflecting film can be changed due to the electrostatic attractive force. Thus, it is possible to emit the light with a desired wavelength from the interference filter.

In the interference filter according to the aspect of the invention described above, it is preferable that a second stress-canceling film, which is adapted to cancel out a film stress of the second reflecting film, is disposed on a surface of the second substrate on an opposite side to the substrate, and in an area overlapping the second reflecting film in a planar view viewed from a normal direction of the surface on the opposite side.

With this configuration, the second stress-canceling film for canceling the film stress of the second reflecting film is provided to the second substrate. Therefore, similarly to the aspect of the invention described above, the disadvantage that second substrate is deflected due to the film stress of the second reflecting film can be suppressed.

In the interference filter according to the aspect of the invention described above, it is preferable that the second stress-canceling film is an antireflection film.

With this configuration, since the second stress-canceling film is the antireflection film, reflection of the incident light to the interference filter and the outgoing light from the interference filter can be suppressed, and thus, the attenuation of the light intensity can be suppressed similarly to the aspect of the invention described above.

In the interference filter according to the aspect of the invention described above, it is preferable that the first reflecting film and the second reflecting film each include a dielectric multilayer film.

With this configuration, the dielectric multilayer films are included as the first reflecting film and the second reflecting film. According to such dielectric multilayer films, since a high reflectance is provided with respect to a predetermined wavelength band, the light with high resolution can be emitted from the interference filter with respect to the wavelength band.

An optical filter device according to another aspect of the invention includes an interference filter including a substrate, a first reflecting film disposed on one surface of the substrate, and formed of a plurality of layers, a second reflecting film opposed to the substrate, and an electrode disposed on the first reflecting film, wherein the first reflecting film includes a region opposed to the second reflecting film, and is disposed in an area extending from the region to an outer circumferential edge of the substrate, and a housing adapted to house the interference filter.

In this aspect of the invention, the first reflecting film is formed of a plurality of layers and is disposed on the entire area of one surface of the substrate, and the electrode is disposed on the surface of the first reflecting film. Therefore, a process such as a lift-off process can be made unnecessary, and thus, the production efficiency is improved compared to the case of disposing the first reflecting film formed of a plurality of layers on a part of one surface of the substrate. Further in the case of disposing the first reflecting film on a part of the substrate using a lift-off process or the like, the risk of breaking is increased due to the step when forming the electrode so as to straddle the outer circumferential edge of the first reflecting film. However, according to this aspect of the invention, since the first reflecting film is disposed in the entire area of the one surface of the substrate, no step exists, and the risk of breaking can be avoided to achieve an improvement of wiring reliability.

Further, since the interference filter is housed in the housing, foreign matters can be inhibited from adhering to the reflecting film, for example, and thus, the interference filter can be protected from an impact or the like.

An optical module according to still another aspect of the invention includes an interference filter including a substrate, a first reflecting film disposed on one surface of the substrate, and formed of a plurality of layers, a second reflecting film opposed to the substrate, and an electrode disposed on the first reflecting film, wherein the first reflecting film includes a region opposed to the second reflecting film, and is disposed in an area extending from the region to an outer circumferential edge of the substrate, and a light receiving section adapted to receive light emitted from the interference filter.

In this aspect of the invention, due to the similar configuration to the aspect of the invention described above, the improvement of production efficiency of the interference filter and the improvement of the wiring reliability can be achieved. Therefore, also in the optical module including the present interference filter, the improvement of the wiring reliability can be achieved.

An electronic apparatus according to yet another aspect of the invention includes an interference filter including a substrate, a first reflecting film disposed on one surface of the substrate, and formed of a plurality of layers, a second reflecting film opposed to the substrate, and an electrode disposed on the first reflecting film, wherein the first reflecting film includes a region opposed to the second reflecting film, and is disposed in an area extending from the region to an outer circumferential edge of the substrate, and a control section adapted to control the interference filter.

In this aspect of the invention, due to the similar configuration to the aspect of the invention described above, the improvement of production efficiency of the interference filter and the improvement of the wiring reliability can be achieved. Therefore, also in the electronic apparatus including the present interference filter, the improvement of the wiring reliability can be achieved.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Figure 1:
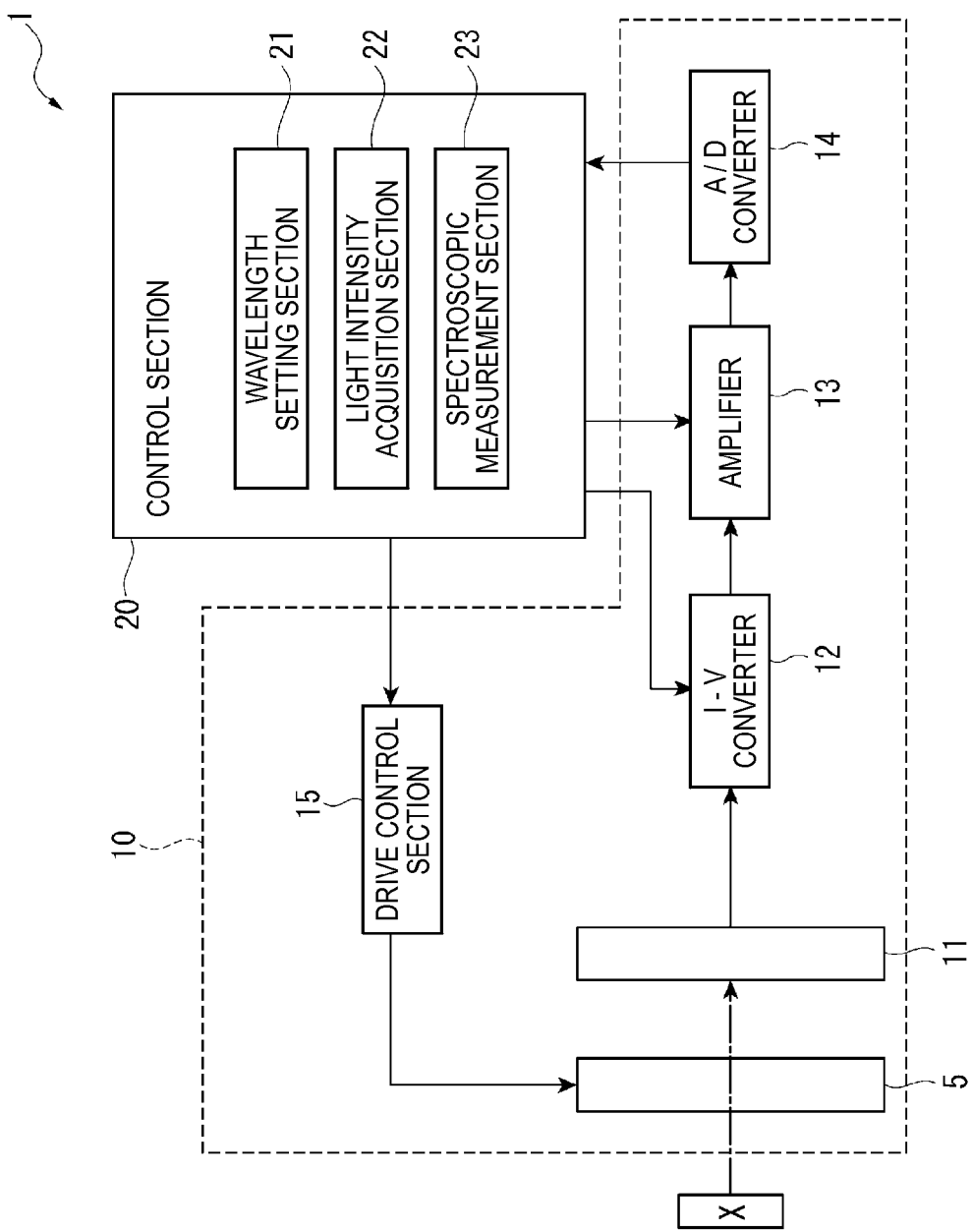
FIG. 1 is a block diagram showing a schematic configuration of a spectroscopic measurement device according to a first embodiment of the invention.

A first embodiment of the invention will hereinafter be explained with reference to the accompanying drawings.
Configuration of Spectroscopic Measurement Device FIG. 1 is a block diagram showing a schematic configuration of a spectroscopic measurement device according to the present embodiment. The spectroscopic measurement device 1 is an example of an electronic apparatus according to an embodiment of the invention, and is a device for analyzing the intensities of light at respective wavelengths in measurement target light having been reflected by, for example, a measurement object X to thereby measure the dispersion spectrum. It should be noted that although in the present embodiment, the example of measuring the measurement target light reflected by the measurement object X is described, in the case of using a light emitting body such as a liquid crystal panel as the measurement object X, it is possible to use the light emitted from the light emitting body as the measurement target light.

Further, as shown in FIG. 1, the spectroscopic measurement device 1 is provided with an optical module 10, and a control section 20 for processing a signal output from the optical module 10.
Configuration of Optical Module The optical module 10 is provided with a variable wavelength interference filter 5, a detector 11, an I-V converter 12, an amplifier 13, an A/D converter 14, and a drive control section 15.

The optical module 10 guides the measurement target light reflected by the measurement object X to the variable wavelength interference filter 5 through an incident optical system (not shown), and then receives the light, which has been transmitted through the variable wavelength interference filter 5, using the detector 11 (a light receiving section). Then, a detection signal output from the detector 11 is output to the control section 20 via the I-V converter 12, the amplifier 13, and the A/D converter 14.
Configuration of Variable Wavelength Interference Filter Next, the variable wavelength interference filter 5 to be incorporated in the optical module 10 will be explained.

Figure 2:
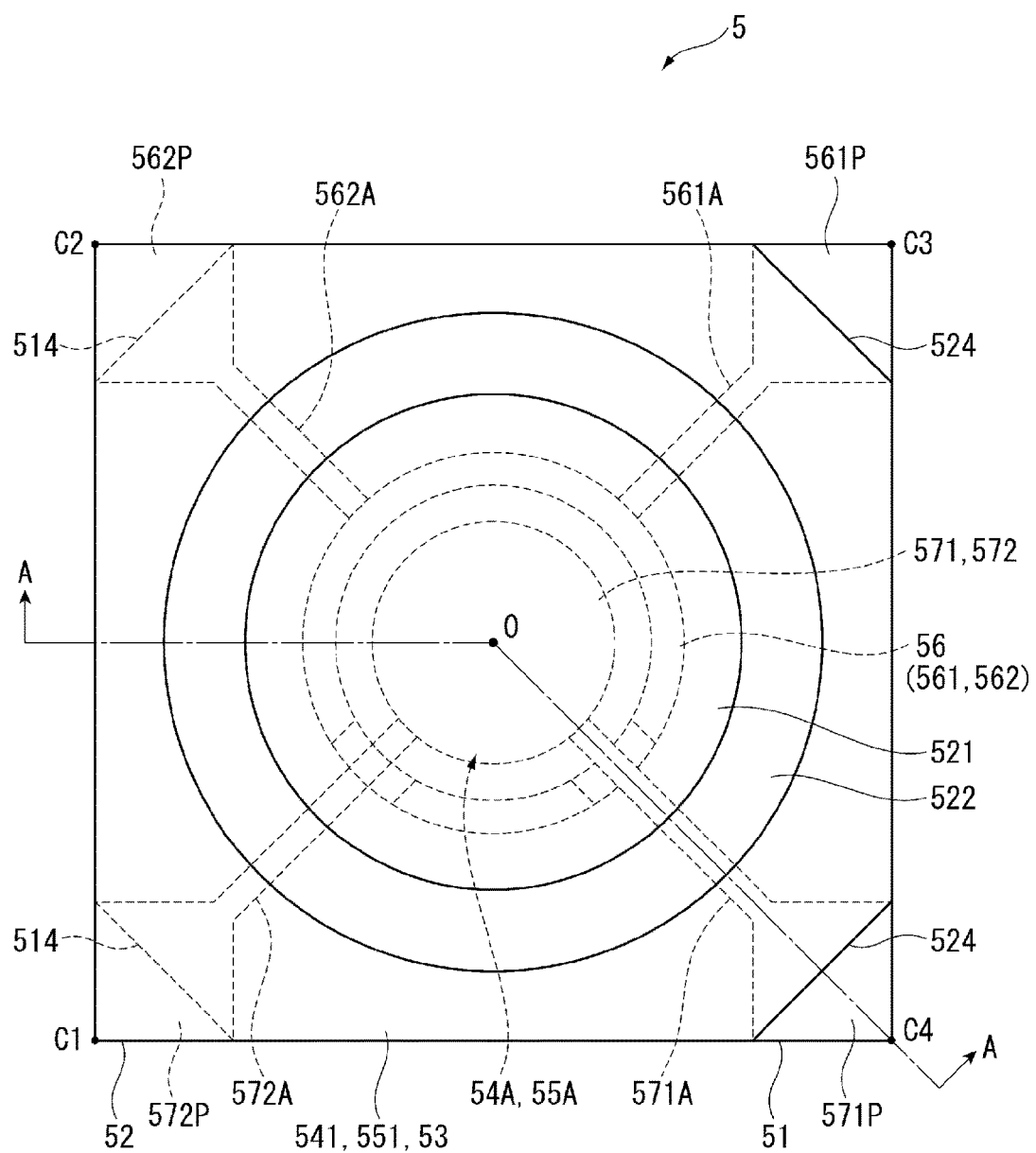
FIG. 2 is a plan view showing a schematic configuration of a variable wavelength interference filter according to the first embodiment.
Figure 3:
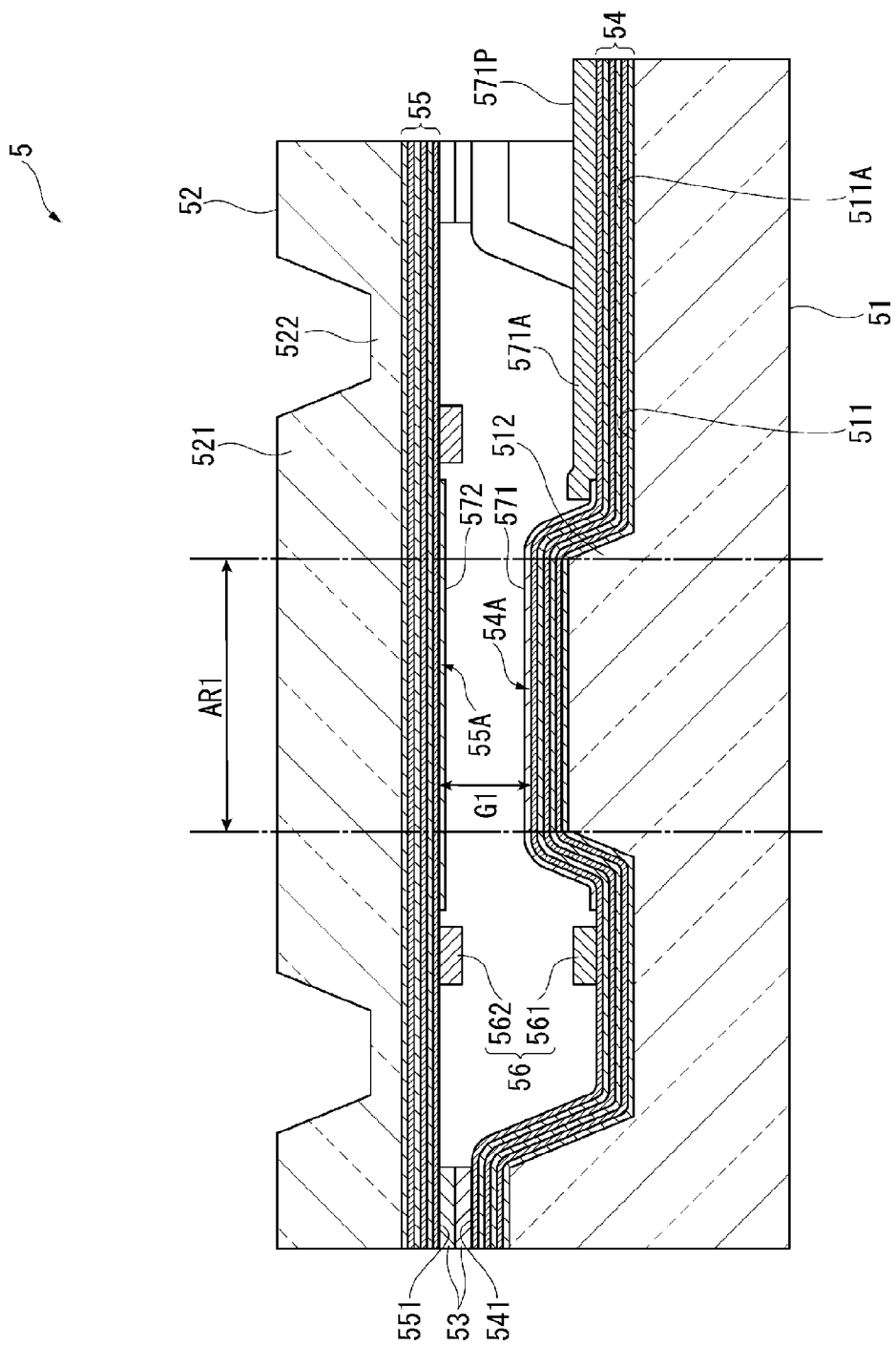
FIG. 3 is a cross-sectional view along the A-A line shown in FIG. 2.

FIG. 2 is a plan view showing a schematic configuration of the variable wavelength interference filter 5. FIG. 3 is a cross-sectional view in the case of cutting the variable wavelength interference filter 5 along the A-A line shown in FIG. 2.

As shown in FIGS. 2 and 3, the variable wavelength interference filter 5 is provided with a stationary substrate 51 as a first substrate according to an embodiment of the invention, and a movable substrate 52 as a second substrate according to an embodiment of the invention. The stationary substrate 51 and the movable substrate 52 are each made of a variety of types of glass such as soda glass, crystalline glass, quartz glass, lead glass, potassium glass, borosilicate glass, or alkali-free glass, or a quartz crystal, for example. Further, the stationary substrate 51 and the movable substrate 52 bonded to each other with bonding films 53 each formed of, for example, a plasma-polymerized film consisting primarily of siloxane to thereby be integrally configured.

A stationary reflecting film 54 constituting a first reflecting film according to an embodiment of the invention is disposed on a surface of the stationary substrate 51, the surface being opposed to the movable substrate 52, and a movable reflecting film 55 constituting a second reflecting film according to an embodiment of the invention is disposed on a surface of the movable substrate 52, the surface being opposed to the stationary substrate 51. Further, a predetermined first region 54A of the stationary reflecting film 54 and a predetermined second region 55A of the movable reflecting film 55 are opposed to each other via a gap G1.

Further, the variable wavelength interference filter 5 is provided with an electrostatic actuator 56 used for adjusting (varying) the gap dimension of the gap G1. The electrostatic actuator 56 is constituted by a first drive electrode 561 disposed on the stationary substrate 51 side and a second drive electrode 562 disposed on the movable substrate 52 side.

It should be noted that in the explanation below, a planar view viewed from the substrate thickness direction of the stationary substrate 51 or the movable substrate 52, namely a planar view of the variable wavelength interference filter 5 viewed from the stacking direction of the stationary substrate 51 and the movable substrate 52, is referred to as a filter planar view. Further, in the present embodiment, the center point of the first region 54A of the stationary reflecting film 54 and the center point of the second region 55A of the movable reflecting film 55 coincide with each other, and these center points in the planar view are denoted with O.
Configuration of Stationary Substrate FIG. 4 is a planar view of the stationary substrate 51 viewed from the movable substrate 52 side.

Figure 4:
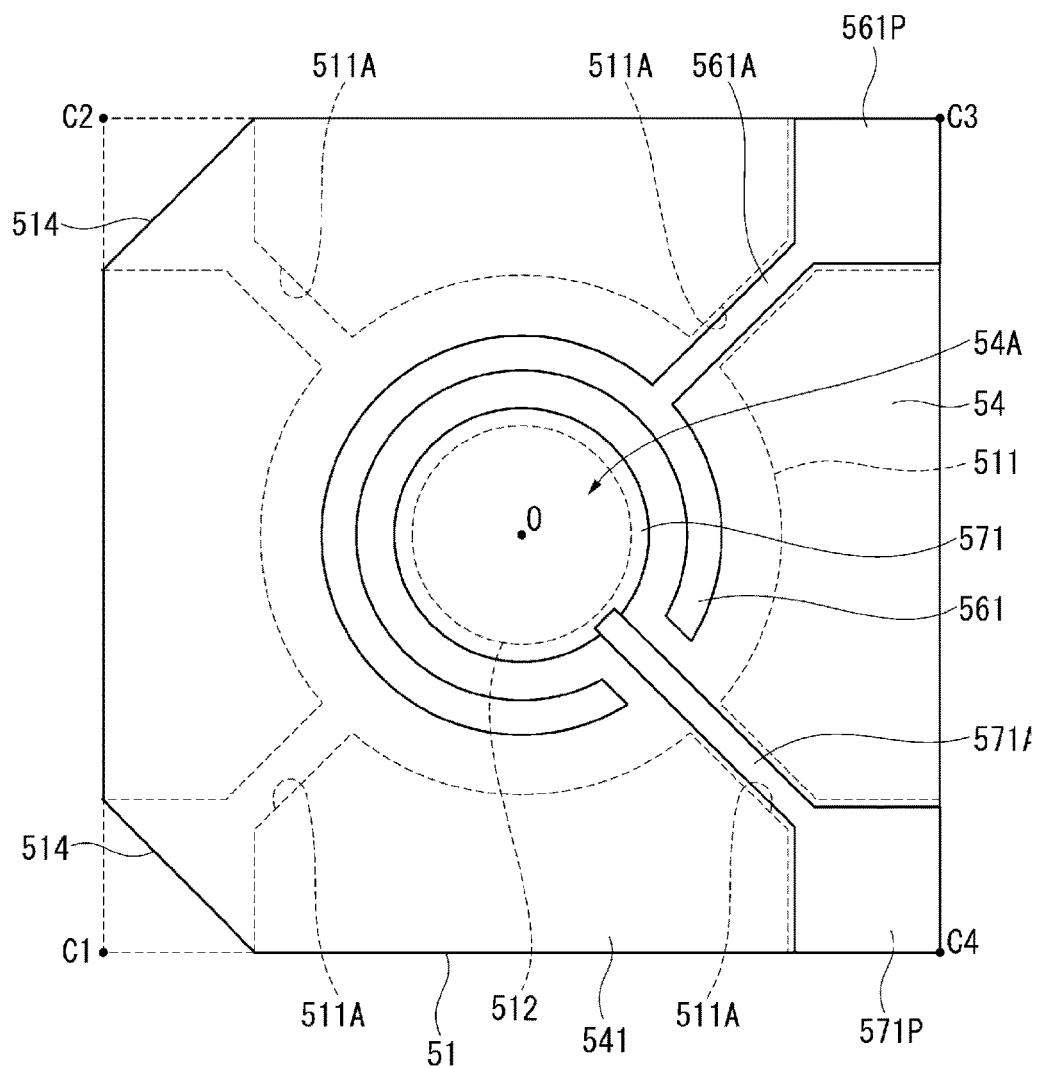
FIG. 4 is a plan view showing a schematic configuration of a stationary substrate of the variable wavelength interference filter according to the first embodiment.

As shown in FIGS. 3 and 4, the stationary substrate 51 is provided with a first groove 511 and a central projecting portion 512 each formed using, for example, an etching process.

The first groove 511 is formed to have a ring-like shape cantered on the filter center point O of the stationary substrate 51 in the filter planar view. The central projecting portion 512 is formed so as to project toward the movable substrate 52 from a central portion of the first groove 511 in the filter planar view. In the present embodiment, in the filter planar view, the center point of the central projecting portion 512 coincides with the filter center point O, and the projection tip surface of the central projecting portion 512 is configured to have a circular shape.

Further, the stationary substrate 51 is provided with second grooves 511A respectively extending toward the vertexes C1, C2, C3, and C4 (see FIGS. 2 and 4) of the stationary substrate 51. The bottom surface of each of these second grooves 511A is coplanar with the bottom surface of the first groove 511.

Further, the vertexes C1, C2 of the stationary substrate 51 are each provided with a cutout portion 514, and a second drive electrode pad 562P and a second mirror electrode pad 572P described later are exposed therefrom when viewing the variable wavelength interference filter 5 from the stationary substrate 51 side.

On the entire surface of the stationary substrate 51, the surface being opposed to the movable substrate 52, there is disposed the stationary reflecting film 54 as shown in FIGS. 3 and 4. The stationary reflecting film 54 is formed of a dielectric multilayer film having high refractive index layers and low refractive index layers stacked alternately on each other. As the dielectric multilayer film, there can be cited, for example, a laminate body having $TiO_2$ as the high refractive index layers and $SiO_2$ as low refractive index layers.

It should be noted that although in the present embodiment, the dielectric multilayer film is described as an example of the stationary reflecting film 54, the stationary reflecting film 54 is not limited to this example, but can be, for example, a laminate body of a dielectric multilayer film with a metal film or an alloy film, or a laminate body of a dielectric film with a metal film or an alloy film. It should also be noted that in the case in which the surface is formed of a metal layer or an alloy layer, it is preferable to adopt a configuration of separately dispose a light transmissive insulating film so as to electrically be insulated from a first drive electrode 561, a first drive connection electrode 561A, a first mirror electrode 571, and a first mirror connection electrode 571A, which will be described later.

Further, in the present embodiment, the region of the projection tip surface of the central projecting portion 512 out of the stationary reflecting film 54 corresponds to the first region 54A described above, and is opposed to the second region 55A of the movable reflecting film 55 via the gap G1.

Further, on the surface of the stationary reflecting film 54, there are disposed the first drive electrode 561, the first drive connection electrode 561A, the first mirror electrode 571 (a mirror electrode according to an embodiment of the invention), the first mirror connection electrode 571A (a mirror connection electrode according to an embodiment of the invention) as electrodes according to an embodiment of the invention.

The first drive electrode 561 constitutes one of the electrodes of the electrostatic actuator 56. The first drive electrode 561 is disposed in an area outside the first region 54A and overlapping the first groove 511 in the filter planar view in the stationary reflecting film 54. The first drive electrode 561 can be disposed directly on the stationary reflecting film 54, or can also be disposed on another thin film (layer) disposed on the stationary reflecting film 54.

The first drive electrode 561 is formed to have a C-shaped circular arc shape centered on the filter center point O, and is provided with an opening of the C shape disposed in a part adjacent to the vertex C4 (i.e., the first drive electrode 531 is split ring shaped). Further, the first drive connection electrode 561A is connected to an outer peripheral edge of the first drive electrode 561. The first drive connection electrode 561A is disposed so as to extend from the outer peripheral edge of the first drive electrode 561 on the vertex C3 side to a position of the vertex C3 on the stationary reflecting film 54. Further, the part of the first drive connection electrode 561A located at the vertex C3 constitutes the first drive electrode pad 561P, and is electrically connected to the drive control section 15.

As a material for forming such a first drive electrode 561 and a first drive connection electrode 561A, metal such as Au, a metal laminate body such as Cr/Au, and so on can be cited. It should be noted that the electrodes each can also be formed of a light transmissive metal oxide film such as indium tin oxide (ITO). On this occasion, by separately forming a metal film made of, for example, Au on a metal oxide film, the contact resistance when connecting the wiring lines can be reduced in the first drive electrode pad 561P.

It should be noted that although in the present embodiment, there is shown a configuration of disposing the single first drive electrode 561 surrounding the first region 54A, it is also possible to adopt, for example, a configuration (a dual electrode configuration) having two concentric electrodes centered on the filter center point O.

The first mirror electrode 571 is disposed so as to cover the first region 54A of the stationary reflecting film 54. In the present embodiment, the first mirror electrode 571 is disposed so as to cover an area including the central projecting portion 512 and a part of the first groove 511 in the filter planar view as shown in FIGS. 3 and 4.

The first mirror electrode 571 is formed of an electrically conductive metal oxide having a light transmissive property with respect to a wavelength band in which the measurement is performed with the spectroscopic measurement device 1, and there can be used, for example, an indium-based oxide such as indium gallium oxide (InGaO), indium tin oxide (Sn doped indium oxide; ITO), Ce doped indium oxide (ICO), or fluorine doped indium oxide (IFO), a tin-based oxide such as antimony doped tin oxide (ATO), fluorine doped tin oxide (FTO), or tin oxide ($SnO_2$), and a zinc-based oxide such as Al doped zinc oxide (AZO), Ga doped zinc oxide (GZO), fluorine doped zinc oxide (FZO), or zinc oxide (ZnO). Further, indium zinc oxide (IZO; registered trademark) formed of an indium-based oxide and a zinc-based oxide can also be used.

In the present embodiment, in the interference region AR1 where the first region 54A of the stationary reflecting film 54 and the second region 55A of the movable reflecting film 55 overlap each other in the filter planar view, multiple interference is caused between the reflecting films 54, 55 to emit light with a predetermined wavelength thus enhanced. Therefore, in the filter planar view, the first mirror electrode 571 disposed in the area overlapping the first region 54A and the second region 55A is formed to have a small thickness dimension compared to the first drive electrode 561, the first drive connection electrode 561A, and the first mirror connection electrode 571A in order to inhibit, for example, absorption or reflection of light from occurring.

The first mirror connection electrode 571A is connected to the outer circumferential portion of the first mirror electrode 571. Specifically, as shown in FIGS. 3 and 4, the first mirror connection electrode 571A is disposed so as to extend onto (thereby running onto and partially overlapping) an upper surface of the first mirror electrode 571 in the portion of the first mirror electrode 571 overlapping a part of the first groove 511 in the filter planar view. On this occasion, as described above, since the first mirror connection electrode 571A is larger in thickness dimension than the first mirror electrode 571, breaking of the first mirror connection electrode 571A does not occur when extending onto the first mirror electrode 571. Further, by increasing the thickness dimension of the first mirror connection electrode 571A, the electrical resistance of the first mirror connection electrode 571A can be inhibited from increasing. It should be noted that although in the present embodiment, there is described an example in which the first mirror connection electrode 571A is disposed so as to extend onto the surface of the first mirror electrode 571, the configuration is not limited to this example, and it is also possible to adopt a configuration in which, for example, the first mirror electrode 571 is disposed so as to extend onto the first mirror connection electrode 571A.

Further, the first mirror connection electrode 571A extends to the position of the vertex C4 of the stationary reflecting film 54 passing through the opening of the C shape of the first drive electrode 561, the opening being disposed on the vertex C4 side. An end portion of the first mirror connection electrode 571A located at the vertex C4 constitutes the first mirror electrode pad 571P, and is electrically connected to the drive control section 15.

Such a first mirror connection electrode 571A can be formed of, for example, a metal film made of Au or the like, and a metal laminate body made of Cu/Au or the like similarly to the first drive electrode 561 and the first drive connection electrode 561A. In the case of forming the first mirror connection electrode 571A from the same material as that of the first drive electrode 561 and the first drive connection electrode 561A, it becomes possible to simultaneously form the first drive electrode 561, the first drive connection electrode 561A, and the first mirror connection electrode 571A in the same process.

In the present embodiment, since the stationary substrate 51 has an uneven structure such as the first groove 511 and the central projecting portion 512, a steep slope or an edge is formed at the boundary between these constituents in some cases. However, by forming the stationary reflecting film 54, which is formed of the dielectric multilayer film composed of a plurality of layers, on the entire surface of the stationary substrate 51 opposed to the movable substrate 52 as described above, the dielectric multilayer film is stacked so as to cover these steps, and therefore, the steep slope and the edge are changed to gentle slopes as shown in FIG. 3 (e.g., the sharp corners near the lower surface of the multilayer film become rounded corners near the upper surface of the multilayer film). Therefore, it results that the electrodes 561, 561A, 571, and 571A disposed on the stationary reflecting film 54 are formed on the gentle slopes or flat surfaces, and breaking or the like can be prevented.

Further, the region of the stationary reflecting film 54 not overlapping the first groove 511, the central projecting portion 512, and the second grooves 511A in the filter planar view becomes a first bonding region 541 to be bonded to the movable reflecting film 55 provided to the movable substrate 52. Further, since the first bonding region 541 is bonded to a second bonding region 551 described later in the movable reflecting film 55 with the bonding films 53, the stationary substrate 51 and the movable substrate 52 are formed integrally.

Configuration of Movable Substrate

Figure 5:
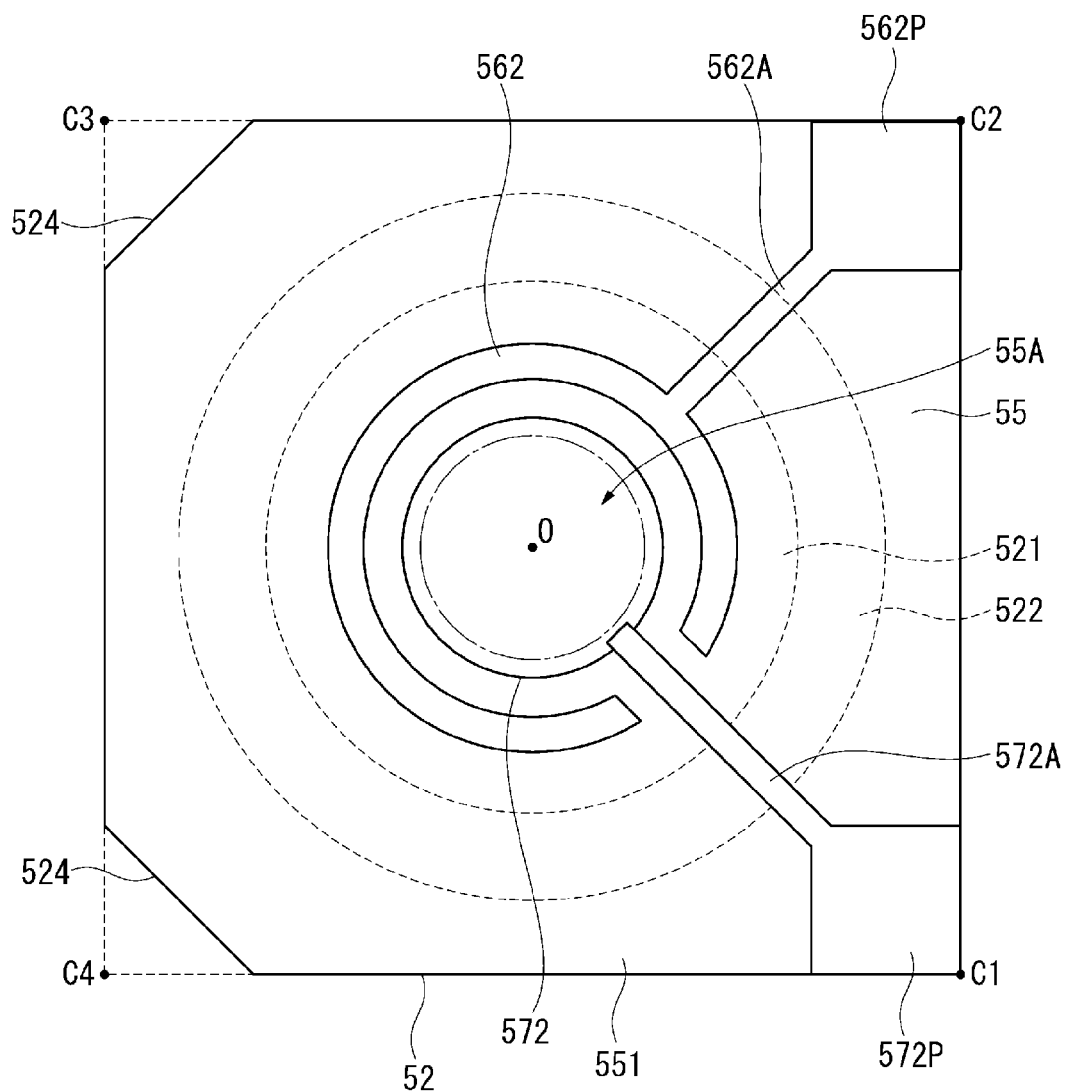
FIG. 5 is a plan view showing a schematic configuration of a movable substrate of the variable wavelength interference filter according to the first embodiment.

FIG. 5 is a plan view of the movable substrate 52 viewed from the stationary substrate 51 side.

As shown in FIGS. 2, 3, and 5, in the filter planar view, the movable substrate 52 is provided with the movable section 521 having a circular shape centered on the filter center point O, and a holding section 522 coaxial with the movable section 521 and for holding the movable section 521. Further, the vertexes C3, C4 of the movable substrate 52 are each provided with a cutout portion 524, and the first drive electrode pad 561P and the second mirror electrode pad 571P are exposed therefrom when viewing the variable wavelength interference filter 5 from the movable substrate 52 side.

The movable section 521 is formed to have a thickness dimension larger than that of the holding section 522, and is formed in the present embodiment, for example, to have the same thickness dimension as that of the movable substrate 52. The movable section 521 is formed to have a diameter larger than at least the diameter of the outer peripheral edge of the first drive electrode 561 in the filter planar view.

The holding section 522 is a diaphragm surrounding the periphery of the movable section 521, and is formed to have a thickness dimension smaller than that of the movable section 521. Such a holding section 522 is easier to be deflected than the movable section 521, and it becomes possible to displace the movable section 521 toward the stationary substrate 51 with a weak electrostatic attractive force. On this occasion, since the movable section 521 has a larger thickness dimension and higher rigidity than those of the holding section 522, the shape variation of the movable section 521 can be suppressed to some extent even in the case in which the movable section 521 is pulled toward the stationary substrate 51 due to the electrostatic attractive force.

It should be noted that although in the present embodiment, the holding section 522 having a diaphragm shape is shown as an example, the shape is not limited to this example, but a configuration of, for example, provided with beam-like holding sections arranged at regular angular intervals centered on the filter center point O of the movable section 521 can also be adopted.

Further, on the entire surface of the movable substrate 52, the surface being opposed to the movable substrate 51, there is disposed the movable reflecting film 55 as shown in FIGS. 3 and 5.

In the movable reflecting film 55, the second region 55A opposed to the first region 54A of the stationary reflecting film 54 is opposed to the first region 54A via the gap G1. The movable reflecting film 55 is formed of a dielectric multilayer film similarly to the stationary reflecting film 54. Further, the movable reflecting film 55 is not limited to the configuration of the dielectric multilayer film similarly to the stationary reflecting film 54, but can be, for example, a laminate body of a dielectric multilayer film with a metal film or an alloy film, or a laminate body of a dielectric film with a metal film or an alloy film. It should be noted that in the case in which a metal film or an alloy film is disposed on the surface, it is preferable to dispose a light transmissive insulating film so as to cover the surface of such a film.

On the surface of the movable reflecting film 55 opposed to the stationary substrate 51, there are disposed a second drive electrode 562, a second drive connection electrode 562A, a second mirror electrode 572 (a second mirror electrode), a second mirror connection electrode 572A (a second mirror connection electrode).

The second drive electrode 562 is opposed to the first drive electrode 561 to constitute the electrostatic actuator 56 together with the first drive electrode 561. The second drive electrode 562 is formed to have a C-shaped circular arc shape centered on the filter center point O, and is provided with an opening of the C shape disposed in a part adjacent to the vertex C1 (i.e., the second drive electrode 562 is split ring shaped).

The second drive connection electrode 562A is connected to the outer circumferential edge of the second drive electrode 562, and extends to the vertex C2 on the movable reflecting film 55 passing through an area opposed to the second groove 511A corresponding to the vertex C2. A part of the second drive connection electrode 562A located at the vertex C2 constitutes the second drive electrode pad 562P, and is electrically connected to the drive control section 15.

The second drive electrode 562 and the second drive connection electrode 562A can be formed of the same electrode material as that of the first drive electrode 561, and metal such as Au, a metal laminate body such as Cr/Au, and so on can be cited. It should be noted that the electrodes each can also be formed of a light transmissive metal oxide film such as indium tin oxide (ITO). On this occasion, in the second drive electrode pad 562P, by separately forming a metal film made of, for example, Au on a metal oxide film, the contact resistance when connecting the wiring lines can be reduced.

The second mirror electrode 572 is disposed so as to cover the second region 55A of the movable reflecting film 55.

The second mirror electrode 572 is formed of an electrically conductive metal oxide having a light transmissive property with respect to a wavelength band in which the measurement is performed with the spectroscopic measurement device 1, and there can be used, for example, an indium-based oxide such as indium gallium oxide (InGaO), indium tin oxide (Sn doped indium oxide; ITO), Ce doped indium oxide (ICO), or fluorine doped indium oxide (IFO), a tin-based oxide such as antimony doped tin oxide (ATO), fluorine doped tin oxide (FTO), or tin oxide ($SnO_2$), and a zinc-based oxide such as Al doped zinc oxide (AZO), Ga doped zinc oxide (GZO), fluorine doped zinc oxide (FZO), or zinc oxide (ZnO). Further, indium zinc oxide (IZO; registered trademark) formed of an indium-based oxide and a zinc-based oxide can also be used.

The second mirror electrode 572 is formed to have a small thickness dimension compared to the second drive electrode 562, the second drive connection electrode 562A, and the second connection electrode 572A.

The second mirror connection electrode 572A is disposed so as to be connected to the outer circumferential portion of the second mirror electrode 572, and to extend onto (thereby running onto and partially overlapping) an upper surface of the second mirror electrode 572. On this occasion, as described above, since the second mirror connection electrode 572A is larger in thickness dimension than the second mirror electrode 572, breaking of the second mirror connection electrode 572A does not occur when extending onto the second mirror electrode 572.

The second mirror connection electrode 572A extends to the position of the vertex C1 of the movable reflecting film 55 passing through the opening of the C shape of the second drive electrode 562 disposed on the vertex C1 side along the area opposed to the second groove 511A corresponding to the vertex C1. An end portion of the second mirror connection electrode 572A located at the vertex C1 constitutes the second mirror electrode pad 572P, and is electrically connected to the drive control section 15.

Similarly to the first mirror connection electrode 571A, the second mirror connection electrode 572A can be formed of, for example, a metal film made of Au or the like, and a metal laminate body made of Cu/Au or the like similarly to the second drive electrode 562 or the second drive connection electrode 562A.

It should be noted that in the present embodiment, as shown in FIG. 3, although a gap between the first drive electrode 561 and the second drive electrode 562 constituting the electrostatic actuator 56 is larger than the gap G1 between the reflecting films 54, 55, the gap is not limited to this configuration. It is also possible to adopt a configuration in which the gap between the electrodes 561, 562 is smaller than the gap G1 depending on the wavelength band of the measurement target light in the case of using, for example, an infrared beam or a far infrared beam as the measurement target light.

Further, in the filter planar view, a region of the movable reflecting film 55 overlapping the first bonding region 541 of the stationary reflecting film 54 becomes the second bonding region 551, and as described above, the second bonding region 551 is bonded to the first bonding region 541 with the bonding films 53.

Configuration of Detector, I-V Converter, Amplifier, and A/D Converter of Optical Module Next, going back to FIG. 1, the optical module 10 will be explained.

The detector 11 receives (detects) the light transmitted through the variable wavelength interference filter 5, and then outputs a detection signal based on the received light intensity to the I-V converter 12.

The I-V converter 12 converts the detection signal input from the detector 11 into a voltage value, and then outputs the voltage value to the amplifier 13.

The amplifier 13 amplifies the voltage value (the detected voltage), which is input from the I-V converter 12, and corresponds to the detection signal.

The A/D converter 14 converts the detected voltage (an analog signal) input from the amplifier 13 into a digital signal, and then outputs the digital signal to the control section 20.

Configuration of Drive Control Section

The drive control section 15 applies a drive voltage to the electrostatic actuator 56 of the variable wavelength interference filter 5 based on the control by the control section 20. Thus, the electrostatic attractive force occurs between the first drive electrode 561 and the second drive electrode 562 of the electrostatic actuator 56, and the movable section 521 is displaced toward the stationary substrate 51.

Further, in the present embodiment, the drive control section 15 make the first mirror electrode pad 571P and the second mirror electrode pad 572P have electrical contact with each other and sets a predetermined reference potential (e.g., the ground potential). Thus, the first mirror electrode 571 and the second mirror electrode 572 becomes in the same electrical potential. Therefore, it is possible to avoid generation of the Coulomb force between the first mirror electrode 571 and the second mirror electrode 572, namely the interference region AR1 (the region where the first region 54A and the second region 55A overlap each other) in the variable wavelength interference filter 5, and it becomes possible to accurately set the dimension of the gap G1 to a desired value. Further, since the charge of the first mirror electrode 571 and the second mirror electrode 572 can be released from the first mirror electrode pad 571P and the second mirror electrode pad 572P, any disadvantage due to charging can also be avoided.

It should be noted that it is also possible to adopt a configuration in which a high frequency voltage in such a level as not to affect drive of the electrostatic actuator 56 is applied between the first mirror electrode 571 and the second mirror electrode 572 to thereby make it possible to detect the capacitance between the first region 54A and the second region 55A.

Configuration of Control Section

Then the control section 20 of the spectroscopic measurement device 1 will be explained.

The control section 20 is configured by combining, for example, a CPU and a memory with each other, and controls an overall operation of the spectroscopic measurement device 1. As shown in FIG. 1, the control section 20 is provided with a wavelength setting section 21, a light intensity acquisition section 22, and a spectroscopic measurement section 23. Further, a memory of the control section 20 stores V-λ data representing a relationship between the wavelength of the light to be transmitted through the variable wavelength interference filter 5 and the drive voltage to be applied to the electrostatic actuator 56 corresponding to the wavelength.

The wavelength setting section 21 sets the target wavelength of the light to be taken out by the variable wavelength interference filter 5, and then outputs an instruction signal, which instructs to apply the drive voltage corresponding to the target wavelength thus set to the electrostatic actuator 56, to the drive control section 15 based on the V-λ data.

The light intensity acquisition section 22 obtains the light intensity of the light with the target wavelength transmitted through the variable wavelength interference filter 5 based on the light intensity obtained by the detector 11.

The spectroscopic measurement section 23 measures the spectrum characteristics of the measurement target light based on the light intensity obtained by the light intensity acquisition section 22.

Method of Manufacturing Variable Wavelength Interference Filter

Next, a method of manufacturing such a variable wavelength interference filter 5 as described above will be explained with reference to the accompanying drawings.

In the manufacturing process of the variable wavelength interference filter 5, a first glass substrate M1 (see FIG. 6A) for forming the stationary substrate 51 and a second glass substrate M2 (see FIG. 7A) for forming the movable substrate 52 are firstly prepared, and then a stationary substrate forming process and a movable substrate forming process are performed. Subsequently, a substrate bonding process is performed to thereby bond the first glass substrate M1 processed in the stationary substrate forming process and the second glass substrate M2 processed in the movable substrate forming process to each other. Further, a cutting process is performed to segment the first glass substrate M1 and the second glass substrate M2 to thereby form the individual variable wavelength interference filter 5.

Each of the processes will hereinafter be explained with reference to the accompanying drawings.

Stationary Substrate Forming Process

Figure 6A:
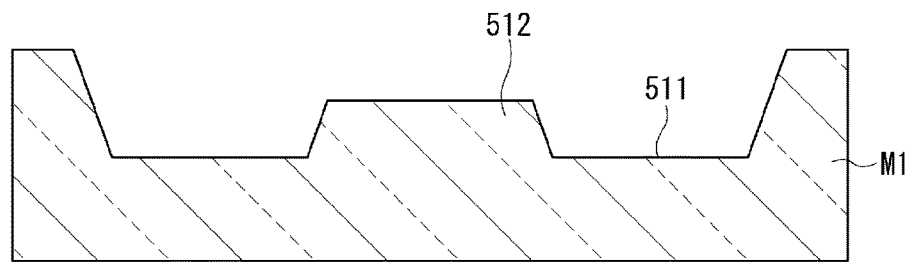
FIGS. 6A through 6C are schematic diagrams each showing a state of a stationary substrate forming process according to the first embodiment.
Figure 6B:
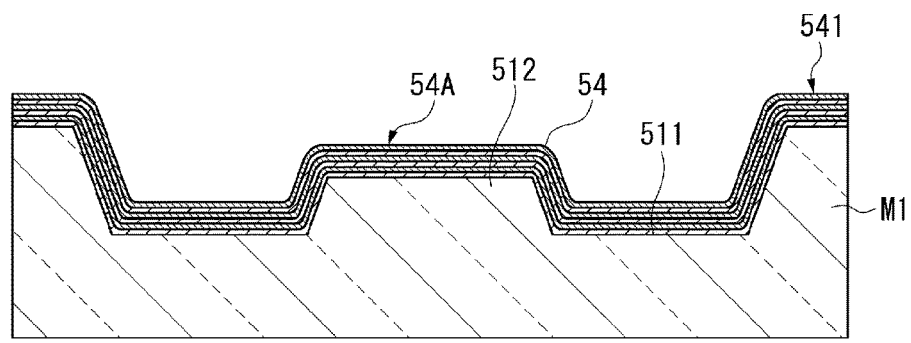
Figure 6C:
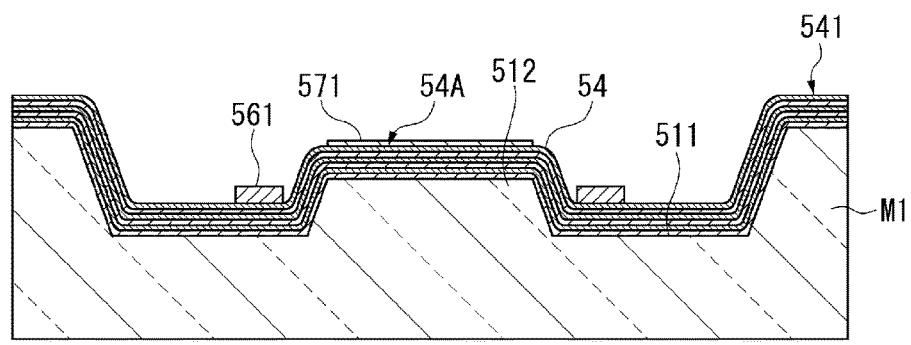

FIGS. 6A through 6C are diagrams each showing the state of the first glass substrate M1 in the stationary substrate forming process.

In the stationary substrate forming process, firstly, fine polishing is performed on both of the surfaces of the first glass substrate M1, which is a manufacturing material of the stationary substrate 51, until the surface roughness Ra becomes equal to or lower than 1 nm to thereby obtain a thickness dimension of, for example, 500 μm.

Then, as shown in FIG. 6A, the substrate surface of the first glass substrate M1 is processed by etching.

Specifically, using a resist pattern patterned using a photolithography method as a mask, a wet-etching process using, for example, a hydrofluoric acid group (e.g., BHF) is repeatedly performed on the first glass substrate M1. Firstly, the positions in which the first groove 511, the central projecting portion 512, and the second grooves 511A (not shown in FIGS. 6A through 6C) are to be formed, are etched to a position corresponding to the projection tip surface of the central projecting portion 512. Subsequently, the positions corresponding to the first groove 511 and the second grooves 511A are etched to a desired depth position.

Then, as shown in FIG. 6B, the stationary reflecting film 54 is formed on the entire surface, in which the first groove 511, the central projecting portion 512, and the second grooves 511A are formed, of the first glass substrate M1.

In the formation of the stationary reflecting film 54, the dielectric films of the dielectric multilayer film constituting the stationary reflecting film 54 are sequentially formed in a stacked manner using, for example, a sputtering method or an evaporation method.

On this occasion, even in the case in which a steep slope or an edge exists in the first glass substrate M1 due to the wet-etching process and so on, the dielectric layers are stacked when forming the dielectric multilayer film to thereby make the slope of the step portion gentle. Therefore, there is no chance for the electrodes 561, 561A, 571, and 571A to be broken in the step portion in the case of forming the electrodes 561, 561A, 571, and 571A on the outermost surface of the stationary reflecting film 54 formed as the dielectric multilayer film.

Subsequently, an electrode material (e.g., a metal oxide such as ITO) constituting the first mirror electrode 571 is deposited on the first glass substrate M1 using an evaporation method, a sputtering method, or the like. Then, a resist is applied to the first glass substrate M1, and then the resist is patterned in accordance with the shape of the first mirror electrode 571 using a photolithography method. Subsequently, the first mirror electrode 571 is patterned using a wet-etching process, and then the resist is removed.

Then, an electrode material (e.g., a metal film made of Au or the like, and a metal laminate body made of Cr/Au or the like) for forming the first drive electrode 561, the first drive connection electrode 561A (not shown in FIGS. 6A through 6C), and the first mirror connection electrode 571A (not shown in FIGS. 6A through 6C) is deposited on the first glass substrate M1 using an evaporation method, a sputtering method, or the like. Then, a resist is applied to the first glass substrate M1, and then the resist is patterned in accordance with the shapes of the first drive electrode 561, the first drive connection electrode 561A, and the first mirror connection electrode 571A using a photolithography method. Then, the first drive electrode 561, the first drive connection electrode 561A, and the first mirror connection electrode 571A are patterned using a wet-etching process, and then the resist is removed.

According to the process described hereinabove, there is formed the first glass substrate M1 having a plurality of stationary substrates 51 arranged in an array, each of the stationary substrates 51 being provided with the stationary reflecting film 54, the first drive electrode 561, the first drive connection electrode 561A, the first mirror electrode 571, and the first mirror connection electrode 571A, as shown in FIG. 6C.

Movable Substrate Forming Process

Figure 7A:
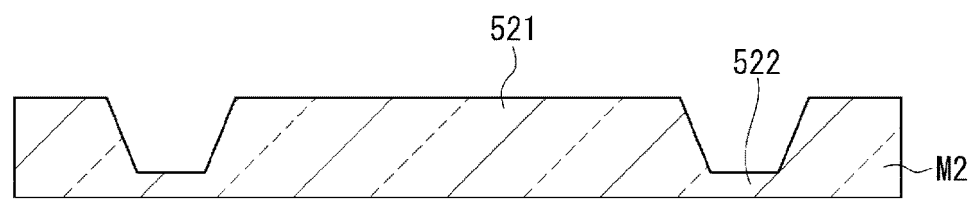
FIGS. 7A through 7C are schematic diagrams each showing a state of a movable substrate forming process according to the first embodiment.
Figure 7B:
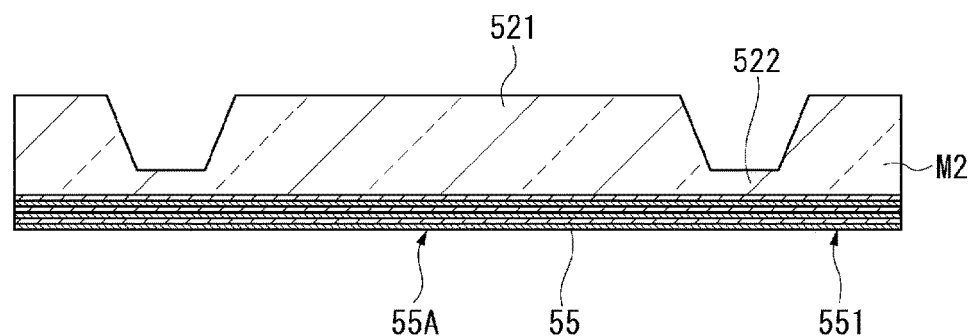
Figure 7C:
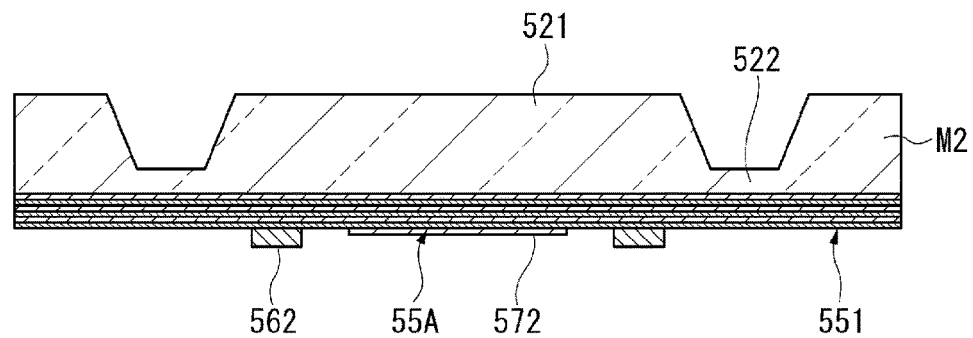

FIGS. 7A through 7C are diagrams each showing the state of the second glass substrate M2 in the movable substrate forming process.

In the movable substrate forming process, firstly, fine polishing is performed on both of the surfaces of the second glass substrate M2, which is a manufacturing material of the movable substrate 52, until the surface roughness Ra becomes equal to or lower than 1 nm to thereby obtain a thickness dimension of, for example, 500 μm.

Then, a Cr/Au layer is formed on the surface of the second glass substrate M2, and then an area corresponding to the holding section 522 is etched with, for example, a hydrofluoric acid group (e.g., BHF) using the Cr/Au layer as an etch mask. Subsequently, by removing the Cr/Au layer used as the etch mask, the substrate shape of the movable substrate 52 is formed as shown in FIG. 7A.

Then, as shown in FIG. 7B, the movable reflecting film 55 is formed. The movable reflecting film 55 can also be formed using a similar method to that of the stationary reflecting film 54, and dielectric films of a dielectric multilayer films for forming the movable reflecting film 55 are sequentially deposited using a sputtering method or an evaporation method.

Subsequently, the second mirror electrode 572 is provided to the second glass substrate M2. The formation of the second mirror electrode 572 is performed using a similar process to the process of the formation of the first mirror electrode 571, and an electrode material constituting the second mirror electrode 572 is deposited using an evaporation method, a sputtering method, or the like, then a resist is applied, and is then patterned in accordance with the shape of the second mirror electrode 572 using a photolithography method. Then, the second mirror electrode 572 is patterned by performing a wet-etching process, and then the resist is removed.

Then, an electrode material for forming the second drive electrode 562, the second drive connection electrode 562A (not shown in FIGS. 7A through 7C), and the second mirror connection electrode 572A (not shown in FIGS. 7A through 7C) is deposited on the second glass substrate M2 using an evaporation method, a sputtering method, or the like. Then, a resist is applied to the second glass substrate M2, and is then patterned using a photolithography method, then the second drive electrode 562, the second drive connection electrode 562A, and the second mirror connection electrode 572A are formed using a wet-etching process, and then the resist is removed.

According to the process described hereinabove, there is formed the second glass substrate M2 having a plurality of movable substrates 52 arranged in an array, each of the movable substrates 52 being provided with the movable reflecting film 55, the second drive electrode 562, the second drive connection electrode 562A, the second mirror electrode 572, and the second mirror connection electrode 572A, as shown in FIG. 7C.

Substrate Bonding Process

Next, the substrate bonding process and the cutting process will be explained.

In the substrate bonding process, firstly, a plasma-polymerized film consisting primarily of polyorganosiloxane is deposited on each of the first bonding region 541 in the stationary reflecting film 54 of the first glass substrate M1 and the second bonding region 551 in the movable reflecting film 55 of the second glass substrate M2 using, for example, a plasma CVD method.

Then, in order to apply the activation energy to the plasma-polymerized films of the first glass substrate M1 and the second glass substrate M2, an $O_2$ plasma process or a UV process is performed. In the case of the $O_2$ plasma process, the process is performed for 30 seconds in the condition in which the $O_2$ flow rate is $1.8 \times 10^{-3}$ (m$^3$/h), the pressure is 27 Pa, and the RF power is 200 W. Further, in the case of the UV process, the process is performed for 3 minutes using excimer UV (wavelength of 172 nm) as the UV source.

After applying the activation energy to the plasma-polymerized film, an alignment adjustment of the first glass substrate M1 and the second glass substrate M2 is performed, then the first glass substrate M1 and the second glass substrate M2 are made to overlap each other via the plasma-polymerized films, and a weight of, for example, 98 (N) is applied to the bonding section for 10 minutes. Thus, the first glass substrate M1 and the second glass substrate M2 are bonded to each other.

Cutting Process

Next, the cutting process will be explained. In the cutting process, the stationary substrate 51 and the movable substrate 52 are carved out chip by chip to form the variable wavelength interference filter 5 shown in FIGS. 2 and 3. For cutting the first glass substrate M1 and the second glass substrate M2, a scribing/breaking process or a laser cutting process, for example, can be used.

Functions and Advantages of First Embodiment

In the present embodiment, the stationary reflecting film 54, which is formed of the dielectric multilayer film, is disposed on the entire surface of the stationary substrate 51 opposed to the movable substrate 52, and the first drive electrode 561, the first drive connection electrode 561A, the first mirror electrode 571, and the first mirror connection electrode 571A are disposed on the stationary reflecting film 54. Similarly, the movable reflecting film 55, which is formed of the dielectric multilayer film, is disposed on the entire surface of the movable substrate 52 opposed to the stationary substrate 51, and the second drive electrode 562, the second drive connection electrode 562A, the second mirror electrode 572, and the second mirror connection electrode 572A are disposed on the movable reflecting film 55.

In such a configuration, when forming the stationary reflecting film 54, a forming process of a lift-off pattern and a lift-off process become unnecessary, and thus, the production efficiency can be improved. The same can be applied to the movable reflecting film 55, and the improvement in the production efficiency can be achieved.

Further, the stationary substrate 51 is provided with the first groove 511 and the central projecting portion 512, and even in the case in which a steep slope, an edge, a step, or the like is formed at the boundary portion between the first groove 511 and the central projecting portion 512, the stationary reflecting film 54, which is formed of the dielectric multilayer film, is disposed so as to cover the steep slope, the edge, of the step. In this case since the plurality of layers of dielectric films of the dielectric multilayer film covers the surface of the steep slope, the edge, or the step, the steep slope, the edge, or the step are each changed to a smooth/gentle slope. Therefore, in the case of forming the first mirror electrode 571 so as to extend from the central projecting portion 512 to the position overlapping the first groove 511, it results that the first mirror electrode 571 is disposed on the flat surface or the gentle slope, and thus, the breaking of the first mirror electrode 571 can be inhibited to enhance the siring reliability.

It should be noted that although in the present embodiment, there is described the example of forming the first mirror electrode 571 extending from the central projecting portion 512 to the part of the first groove 511, it is also possible to dispose the first mirror electrode 571 only in, for example, an area overlapping the projection tip surface of the central projecting portion 512. In this case, it results that the first mirror connection electrode 571A is disposed extending from the central projecting portion 512 to the second groove 511A through the first groove 511. Even in this case, since the stationary reflecting film 54 is disposed on the entire area of one of the surfaces of the stationary substrate 51 as described above, any step existing between the first groove 511 and the central projecting portion 512 becomes a gentle slope, and thus the breaking of the first mirror connection electrode can be inhibited to thereby enhance the wiring reliability.

Further, in the case of disposing the stationary reflecting film 54 and the movable reflecting film 55 on a part (e.g., the position overlapping the projection tip surface of the central projecting portion 512 in the filter planar view) of the stationary substrate 51 or the movable substrate 52, the end surface (the surface along the substrate thickness direction) of each of the stationary reflecting film 54 and the movable reflecting film 55 becomes a surface roughly perpendicular to the substrate. In this case, if there is adopted the configuration in which the mirror electrode is formed on the reflecting film, and the mirror connection electrode is extracted from the outer circumferential edge of the mirror electrode, the risk that the breaking of the mirror electrode or the mirror connecting electrode occurs on the end surface of the reflecting film is raised. In contrast, according to the present embodiment, there is no chance for the mirror electrodes 571, 572 and the mirror connection electrodes 571A, 572A to be disposed on the end surfaces of the reflecting films 54, 55 as described above, and therefore, in view of this point, it is possible to avoid the breaking of the mirror electrodes 571, 572 and the mirror connection electrodes 571A, 572A can be avoided, and thus, the reliability of the wiring connection can further be enhanced.

In the present embodiment, the first mirror electrode 571 and the second mirror electrode 572 opposed to each other are provided in the interference region AR1. Therefore, by connecting these mirror electrodes 571, 572 to the ground circuit or the like in the drive control section 15, the charging of the first mirror electrode 571 and the second mirror electrode 572 can be inhibited. Further, the first mirror electrode 571 and the second mirror electrode 572 become in the same electrical potential, and thus the Coulomb force can be inhibited from occurring, and thus, the drive control by the electrostatic actuator 56 can accurately be performed.

Further, although in the present embodiment there is described the example of using the first mirror electrode 571 and the second mirror electrode 572 as an antistatic electrodes, the invention is not limited to this example, but the first mirror electrode 571 and the second mirror electrode 572 can also be used as the electrodes for detecting the capacitance as described above. In this case, by detecting the capacitance between the mirror electrodes 571, 572, the dimension of the gap G1 between the first region 54A and the second region 55A can be calculated. Therefore, by controlling the dimension of the gap G1 based on the dimension of the gap G1 thus detected, the gap G1 can be set to a desired dimension, and thus, the light with the desired wavelength can be emitted from the variable wavelength interference filter 5.

In the present embodiment, the first drive electrode 561 and the first drive connection electrode 561A are disposed on the stationary reflecting film 54. Further, the second drive electrode 562 and the second drive connection electrode 562A are disposed on the movable reflecting film 55. Therefore, it results that these drive electrodes 561, 562 and drive connection electrodes 561A, 562A are also disposed on the reflecting films 54, 55 having the flat surface or the gentle slope as the surface, and the risk of breaking can be decreased.

Further, by applying a voltage between the first drive electrode 561 and the second drive electrode 562, the dimension of the gap G1 between the reflecting films 54, 55 can be changed, and thus, the light with the desired wavelength can be emitted from the variable wavelength interference filter 5.

In the present embodiment, the stationary reflecting film 54 and the movable reflecting film 55 are each formed of a plurality of layers including the dielectric multilayer film. Since such a dielectric multilayer film has a high reflectance with respect to a predetermined wavelength band, it is possible to emit the light with a sharp peak also in the variable wavelength interference filter 5. In other words, the light emitted from the variable wavelength interference filter 5 becomes the light with a small half band width, and the improvement in resolution can be achieved. Therefore, in the optical module 10 using such a variable wavelength interference filter 5, a more accurate light intensity of the light with a desired wavelength can be detected, and the accuracy of the spectroscopic measurement process in the spectroscopic measurement device 1 can also be improved.

Second Embodiment

Next, a second embodiment of the invention will be explained with reference to the accompanying drawings.

In the first embodiment described above, there is adopted the configuration in which the stationary reflecting film 54 is disposed on the entire surface of the stationary substrate 51 opposed to the movable substrate 52, and the movable reflecting film 55 is disposed on the entire surface of the movable substrate 52 opposed to the stationary substrate 51. However, in some cases, an influence of a film stress exerted by these reflecting films 54, 55 to the substrates 51, 52 becomes strong to cause deflection in the substrates 51, 52. In contrast, the second embodiment is different from the first embodiment in the point that a stress-canceling film for reducing the film stress described above is disposed in each of the substrates 51, 52.

Figure 8:
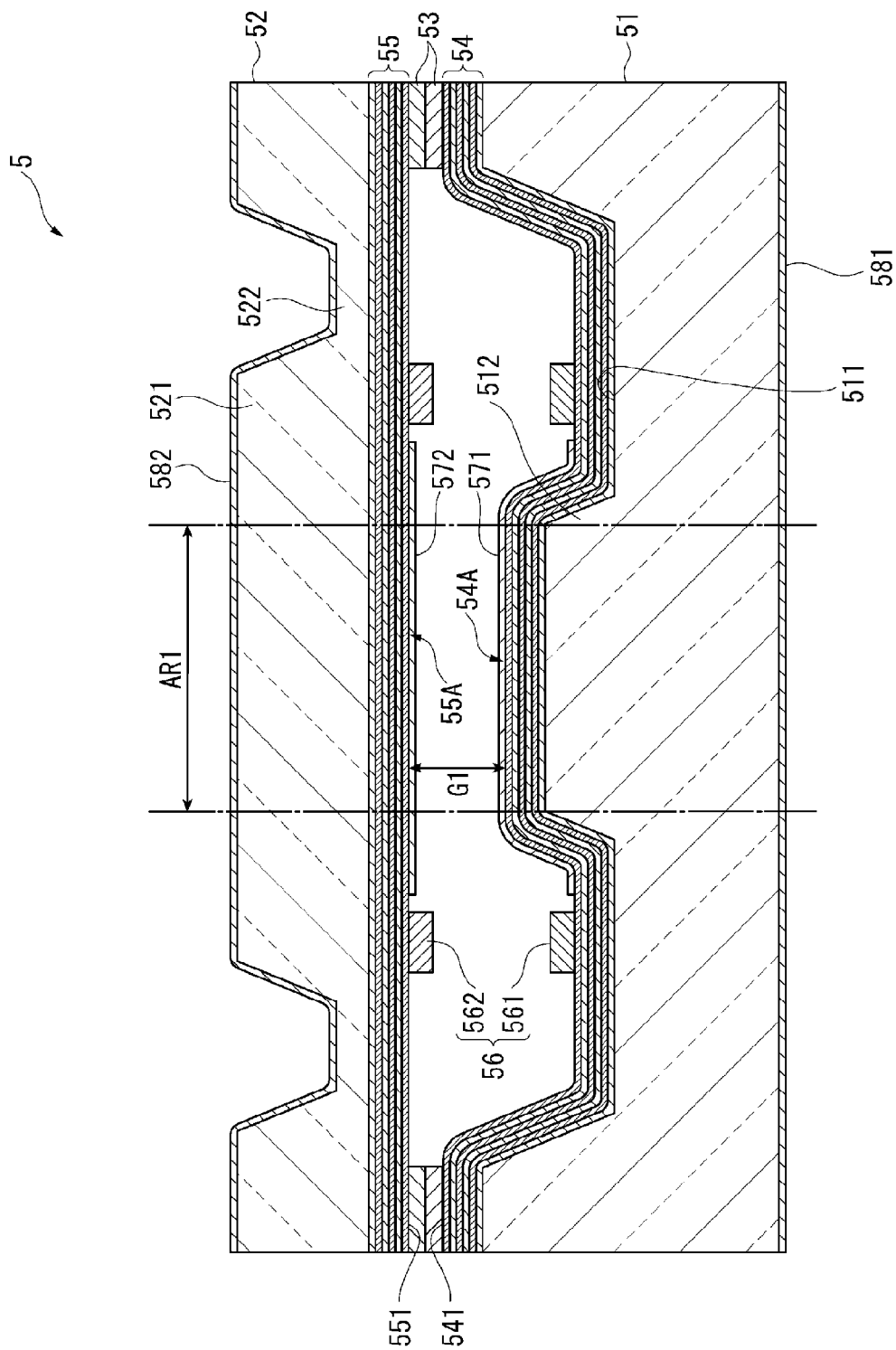
FIG. 8 is a cross-sectional view showing a schematic configuration of a variable wavelength interference filter according to a second embodiment of the invention.

FIG. 8 is a cross-sectional view showing a schematic configuration of the variable wavelength interference filter 5 according to the present embodiment. It should be noted that the constituents having already been explained are denoted with the same reference symbols, and the explanation thereof will be omitted.

As shown in FIG. 8, in the variable wavelength interference filter 5 according to the present embodiment, the stress-canceling film 581 is disposed on the entire surface of the stationary substrate 51 on the opposite side to the movable substrate 52.

Further, regarding the movable substrate 52, the stress-canceling film 582 (a second stress-canceling film according to an embodiment of the invention) is also disposed on the entire surface on the opposite side to the stationary substrate 51 in a similar manner.

Specifically, the stress-canceling film 581 has roughly the same film stress as the stationary reflecting film 54, and applies the stress having the same direction as the direction of the film stress of the stationary reflecting film 54.

In the stationary reflecting film 54 formed of the dielectric multilayer film, the film stress and the direction in which the stress is exerted are changed in accordance with the type, thickness, deposition method, and so on of the dielectric films, and the film stress of the stationary reflecting film 54 is obtained as the resultant force of the stresses of the respective dielectric films. Therefore, the stress-canceling film 581 is selected in accordance with the type, the thickness, the deposition method of each of the dielectric films of the stationary reflecting film 54.

For example, in the case in which the stationary reflecting film 54 is a film for applying a predetermined tensile stress to the stationary substrate 51, a film for applying a tensile stress having roughly the same magnitude to the stationary substrate 51 is used as the stress-canceling film 581. Thus, although the film stress for contracting the side of the stationary substrate 51 on which the stationary reflecting film 54 is disposed to deflect the stationary substrate 51 to have a convex shape toward the movable substrate 52 is applied to the stationary substrate 51, the stress-canceling film 581 contracts the side on which the stress-canceling film 581 is disposed to act so as to cancel the film stress, and thus the deflection of the stationary substrate 51 can be suppressed.

The same applies to the stress-canceling film 582, and the stress-canceling film 582 is selected in accordance with the type, the thickness, the deposition method of each of the dielectric films of the movable reflecting film 55.

Further, it is preferable to use an antireflection film made of, for example, $MgF_2$ as the stress-canceling films 581, 582.

By using such antireflection films, it is possible to suppress the reflection of the light entering the variable wavelength interference filter 5 and the light emitted from the variable wavelength interference filter 5 on the substrate surfaces to thereby suppress the light intensity loss of the light to be received by the detector 11.

Functions and Advantages of Second Embodiment

In the present embodiment, the stress-canceling film 581 for canceling out the film stress of the stationary reflecting film 54 is disposed on the surface of the stationary substrate 51 on the opposite side to the surface on which the stationary reflecting film 54 is disposed. Therefore, the deflection of the stationary substrate 51 can be suppressed to thereby suppress the deflection of the stationary reflecting film 54 in the interference region AR1 (the first region 54A). Similarly, the stress-canceling film 582 for canceling out the film stress of the movable reflecting film 55 is disposed on the surface of the movable substrate 52 on the opposite side to the surface on which the movable reflecting film 55 is disposed. Therefore, the deflection of the movable substrate 52 can be suppressed to thereby suppress the deflection of the movable reflecting film 55 in the interference region AR1 (the second region 55A). Therefore, the deterioration of the resolution in the variable wavelength interference filter 5 can further be suppressed.

Further, by using the antireflection films as the stress-canceling films 581, 582, the reflection of the incident light to the variable wavelength interference filter 5 and the outgoing light from the variable wavelength interference filter 5 can be suppressed. Thus, the light intensity of the light received by the detector 11 can be increased in the optical module 10, and the spectroscopic measurement accuracy can also be improved in the spectroscopic measurement device 1.

Modified Example of Second Embodiment

Figure 9:
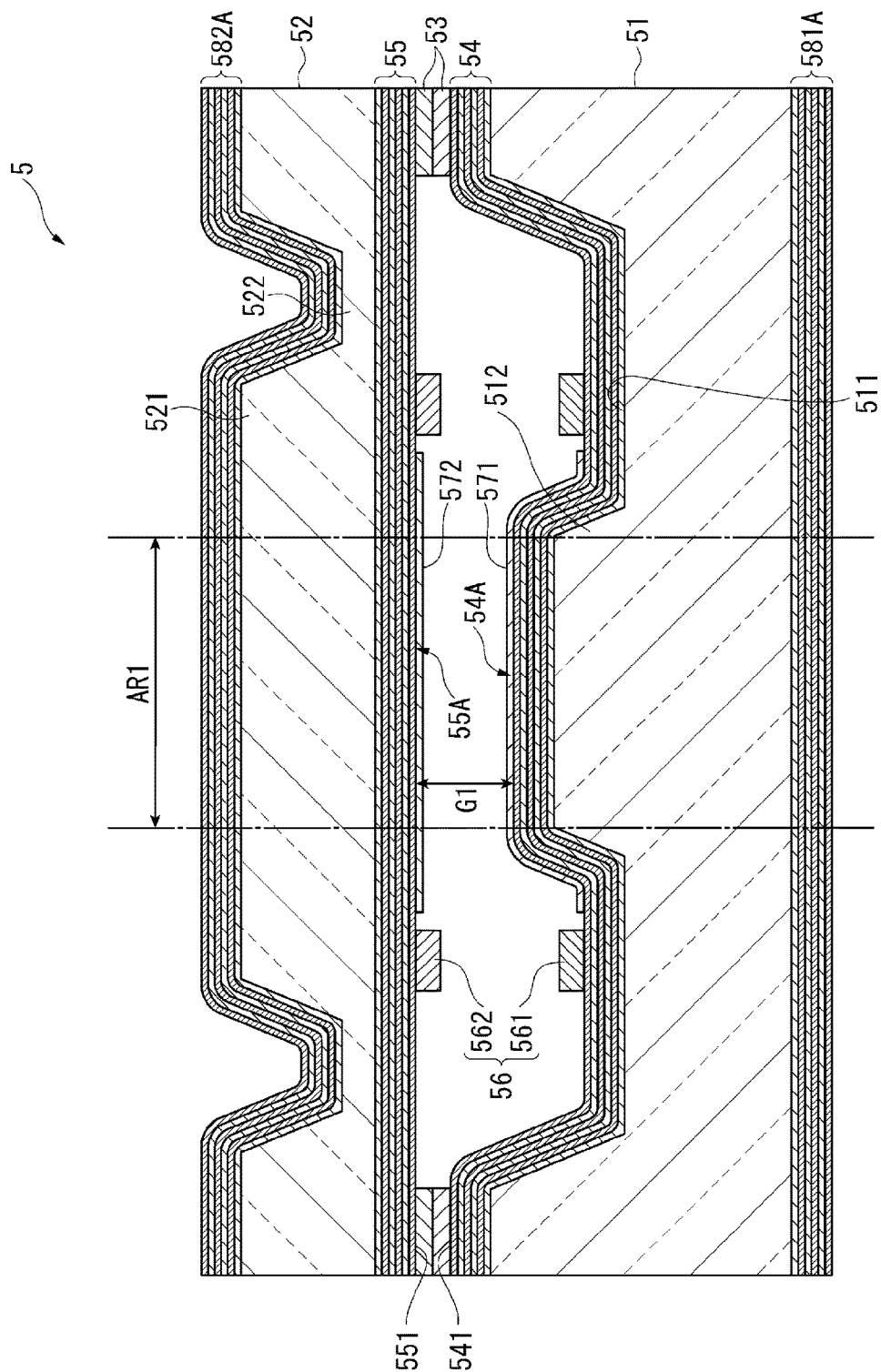
FIG. 9 is a cross-sectional view showing a schematic configuration of a variable wavelength interference filter according to a modified example of the second embodiment.

In the above description of the second embodiment, FIG. 8 shows the stress-canceling films 581, 582 each formed of a single layer as an example, but the invention is not limited to this example. FIG. 9 is a cross-sectional view of the variable wavelength interference filter 5, showing a modified example of the second embodiment.

As shown in FIG. 9, stress-canceling films 581A, 582A can each be formed of a multilayer film having a plurality of dielectric films stacked on each other.

Specifically, the dielectric multilayer films each can also function as a reflecting film such as the stationary reflecting film 54 or the movable reflecting film 55, or can also function as an antireflection layer depending on the film thickness of each of the film layers.

In the present example, using such a feature, the antireflection layer, which is formed of the dielectric multilayer film, is formed as each of the stress-canceling films 581A, 582A. On this occasion, the stress-canceling films 581A, 582A are formed by the same deposition method using the same material as in the case of each of the dielectric films of the dielectric multilayer film constituting the reflecting films 54, 55. For example, in the case of forming the reflecting films 54, 55 using $TiO_2$ as the high refractive index layer and $SiO_2$ as the low refractive index layer, the stress-canceling films 581A, 582A are also formed of $TiO_2$ as the high refractive index layer and $SiO_2$ as the low refractive index layer. Further, it is more preferable to set the total film thickness of the high refractive index layers the same between the reflecting films 54, 55 and the stress-canceling films 581A, 582A, and to set the total film thickness of the low refractive index layers the same between the reflecting films 54, 55 and the stress-canceling films 581A, 582A. In this case, the film stress of the reflecting films 54, 55 and the film stress of the stress-canceling films 581A, 582A are balanced out, and thus, the deflection of the substrates 51, 52 due to the film stress can more surely be reduced.

Third Embodiment

Next, a third embodiment of the invention will be explained with reference to the accompanying drawings.

In the spectroscopic measurement device 1 according to the first embodiment described above, there is adopted the configuration in which the variable wavelength interference filter 5 is directly mounted to the optical module 10. However, some optical modules have a complicated configuration, and there are some cases in which it is difficult to directly mount the variable wavelength interference filter 5 in particular to a small-sized optical module. In the present embodiment, an optical filter device, which makes it possible to easily install the variable wavelength interference filter 5 also to such an optical module, will hereinafter be explained.

Figure 10:
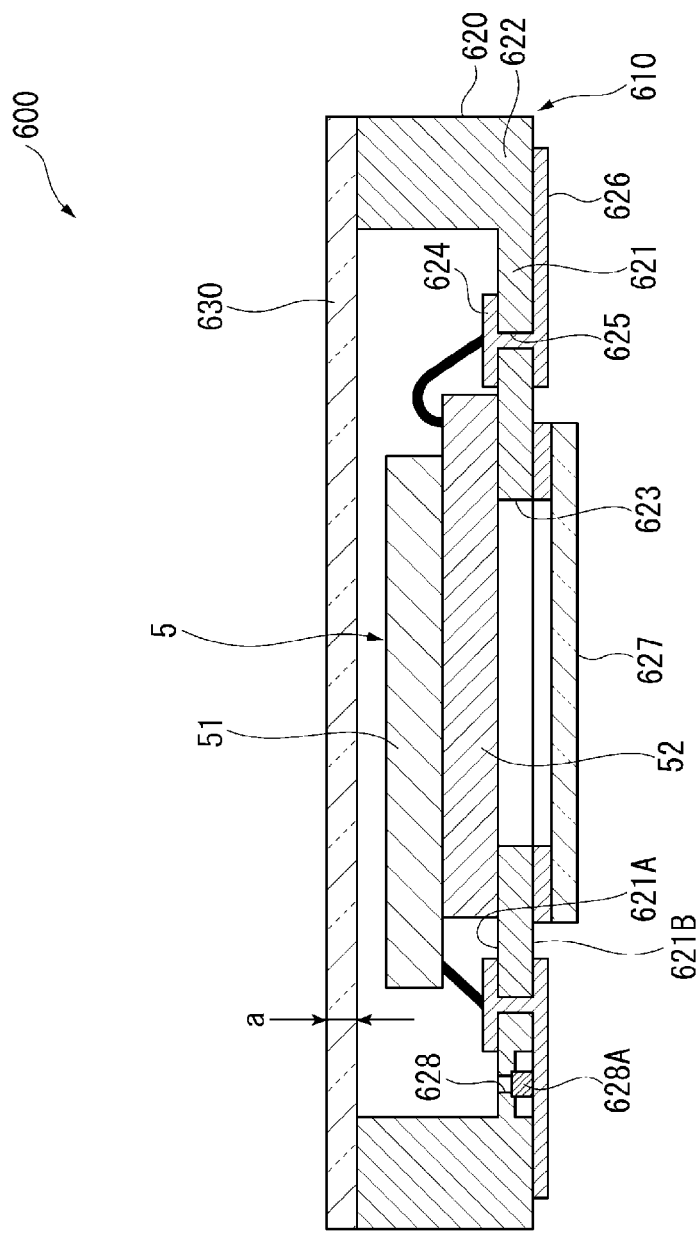
FIG. 10 is a cross-sectional view showing a schematic configuration of an optical filter device according to a third embodiment of the invention.

FIG. 10 is a cross-sectional view showing a schematic configuration of the optical filter device according to the third embodiment of the invention.

As shown in FIG. 10, the optical filter device 600 is provided with a housing 610, and the variable wavelength interference filter 5 housed inside the housing 610.

As shown in FIG. 10, the housing 610 is provided with a base 620 and a lid 630. By bonding the base 620 and the lid 630 to each other, a housing space is formed inside, and the variable wavelength interference filter 5 is housed in the housing space.

Configuration of Base

The base 620 is formed of, for example, ceramic or the like. The base 620 is provided with a pedestal section 621 and a sidewall section 622.

The pedestal section 621 is formed to have a plate shape having, for example, a rectangular outer shape in the filter planar view, and the sidewall section 622 having a cylindrical shape stands in the circumferential portion of the pedestal section 621 towards the lid 630.

The pedestal section 621 is provided with an opening 623 penetrating in the thickness direction. The opening 623 is disposed so as to include the region overlapping the reflecting films 54, 55 in a planar view of viewing the pedestal section 621 in the thickness direction in the state in which the variable wavelength interference filter 5 is housed in the pedestal section 621.

Further, a glass member 627 for covering the opening 623 is bonded to a surface (a base outer surface 621B) of the pedestal 621 on an opposite side to the lid 630. As the bonding method of bonding the pedestal section 621 and the glass member 627, there can be used, for example, low-melting-point glass bonding using a glass frit (low-melting-point glass), which is a scrap of glass obtained by melting a glass material at high temperature and then rapidly cooling it, and bonding with epoxy resin or the like. In the present embodiment, the housing space is airtightly maintained in the state of keeping the reduced pressure. Therefore, it is preferable for the pedestal section 621 and the glass member 627 to be bonded to each other using the low-melting-point glass bonding.

Further, an inner surface (abase inner surface 621A) of the pedestal section 621 opposed to the lid 630 is provided with internal terminal sections 624 to be connected to the respective electrode pads 561P, 562P, 571P, and 572P of the variable wavelength interference filter 5. The internal terminal sections 624 and the respective electrode pads 561P, 562P, 571P, and 572P are connected to each other by, for example, wire bonding using wires made of, for example, Au. It should be noted that although in the present embodiment, the wire bonding is described as an example, it is also possible to use, for example, flexible printed circuits (FPC).

Further, the pedestal section 621 is provided with through holes 625 formed at positions where the internal terminal sections 624 are disposed. The internal terminal sections 624 are connected to external terminal sections 626 disposed on the base outer surface 621B of the pedestal section 621 via the through holes 625.

The sidewall section 622 stands from the edge portion of the pedestal section 621, and surrounds the periphery of the variable wavelength interference filter 5 mounted on the base inner surface 621A. The surface (an end surface 622A) of the sidewall section 622 opposed to the lid 630 is a flat surface parallel to, for example, the base inner surface 621A.

Further, the variable wavelength interference filter 5 is fixed to the base 620 using the fixation member such as an adhesive. On this occasion, the variable wavelength interference filter 5 can be fixed to the pedestal section 621, or can also be fixed to the sidewall section 622. Although the fixation member can be disposed at a plurality of places, it is preferable to fix the variable wavelength interference filter 5 at one place in order to inhibit the stress of the fixation member from being transmitted to the variable wavelength interference filter 5.

Configuration of Lid

The lid 630 is a transparent member having a rectangular outer shape in a planar view, and is formed of, for example, glass.

As shown in FIG. 10, the lid 630 is bonded to the sidewall section 622 of the base 620. As the bonding method, for example, bonding with the low-melting-point glass can be cited.

Functions and Advantages of Third Embodiment

In the optical filter device 600 according to the present embodiment described above, since the variable wavelength interference filter 5 is protected by the housing 610, breakage of the variable wavelength interference filter 5 due to an external factor can be prevented.

Other Embodiments

It should be noted that the invention is not limited to the embodiments described above, but includes modifications, improvements, and so on within a range where the advantages of the invention can be achieved.

Although in the embodiments described above there is adopted the configuration in which the stationary reflecting film 54 and the movable reflecting film 55 are each formed of the dielectric multilayer film, the configuration with the laminate body of a dielectric film and a metal film or an alloy film, and the configuration with the laminate body of a dielectric multilayer film and a metal film or an alloy film can be cited as described above.

Although in the embodiments described above the configuration of disposing the stationary reflecting film 54 as the first reflecting film on the stationary substrate 51 as the first substrate, and disposing the movable reflecting film 55 as the second reflecting film on the movable substrate 52 as the second substrate is described as an example, the invention is not limited to this configuration. For example, a configuration not provided with the second substrate can also be adopted. In this case, for example, the stationary reflecting film 54, the electrodes 561, 561A, 571, and 571A are formed on the first glass substrate M1, then a sacrifice layer is further formed, and then the second drive electrode 562, the second drive connection electrode 562A, the second mirror electrode 572, the second mirror connection electrode 572A, and the movable reflecting film 55 are formed so as to cover the sacrifice layer. Subsequently, the sacrifice layer is removed by etching or the like. In the present configuration, the configuration eliminating the second substrate is obtained, and thus, the variable wavelength interference filter can be made thinner.

Although in the above description of the embodiments, there is described the example of forming the mirror electrodes 571, 572 and the mirror connection electrodes 571A, 572A using respective materials different from each other, the invention is not limited to this example. For example, it is also possible to form the mirror electrodes 571, 572 and the mirror connection electrodes 571A, 572A at the same time using the same material. In the case of using the metal oxide such as ITO as the material of the mirror electrodes 571, 572, it is preferable to dispose a metal film on each of the mirror electrode pads 571P, 572P to thereby decrease the contact resistance when connecting the wiring.

Further, it is also possible to dispose an insulating film on each of the electrodes 561, 562, 561A, 562A, 571, 572, 571A, and 572A. By disposing the insulating films, the deterioration of the electrodes can be suppressed, and the discharge between the electrodes opposed to each other and so on can be prevented.

Further, although the first mirror electrode 571 is disposed so as to extend from the central projecting portion 512 of the stationary reflecting film 54 to a part of the first groove section 511 in the stationary substrate 51, the invention is not limited to this configuration, but there can also be adopted a configuration of disposing the first mirror electrode 571 only in the first region 54A of the stationary reflecting film 54.

Although in the embodiments described above there is adopted the configuration in which the gap dimension between the reflecting films 54, 55 can be changed by the electrostatic actuator 56, the invention is not limited to this configuration. For example, the invention can also be applied to a fixed wavelength Fabry-Perot etalon.

In the fixed wavelength interference filter, the movable section 521 and the holding section 522 as in the embodiments described above are not provided, and the distance between the stationary substrate 51 and the movable substrate 52 is kept constant. Even in such a case, by removing the charge of the stationary reflecting film 54 and the movable reflecting film 55, the distance between the reflecting films can be kept constant.

Although the spectroscopic measurement device 1 is cited in each of the embodiments described above as an example of the electronic apparatus according to the invention, the optical module and the electronic apparatus can be applied in a variety of fields besides the above.

Figure 11:
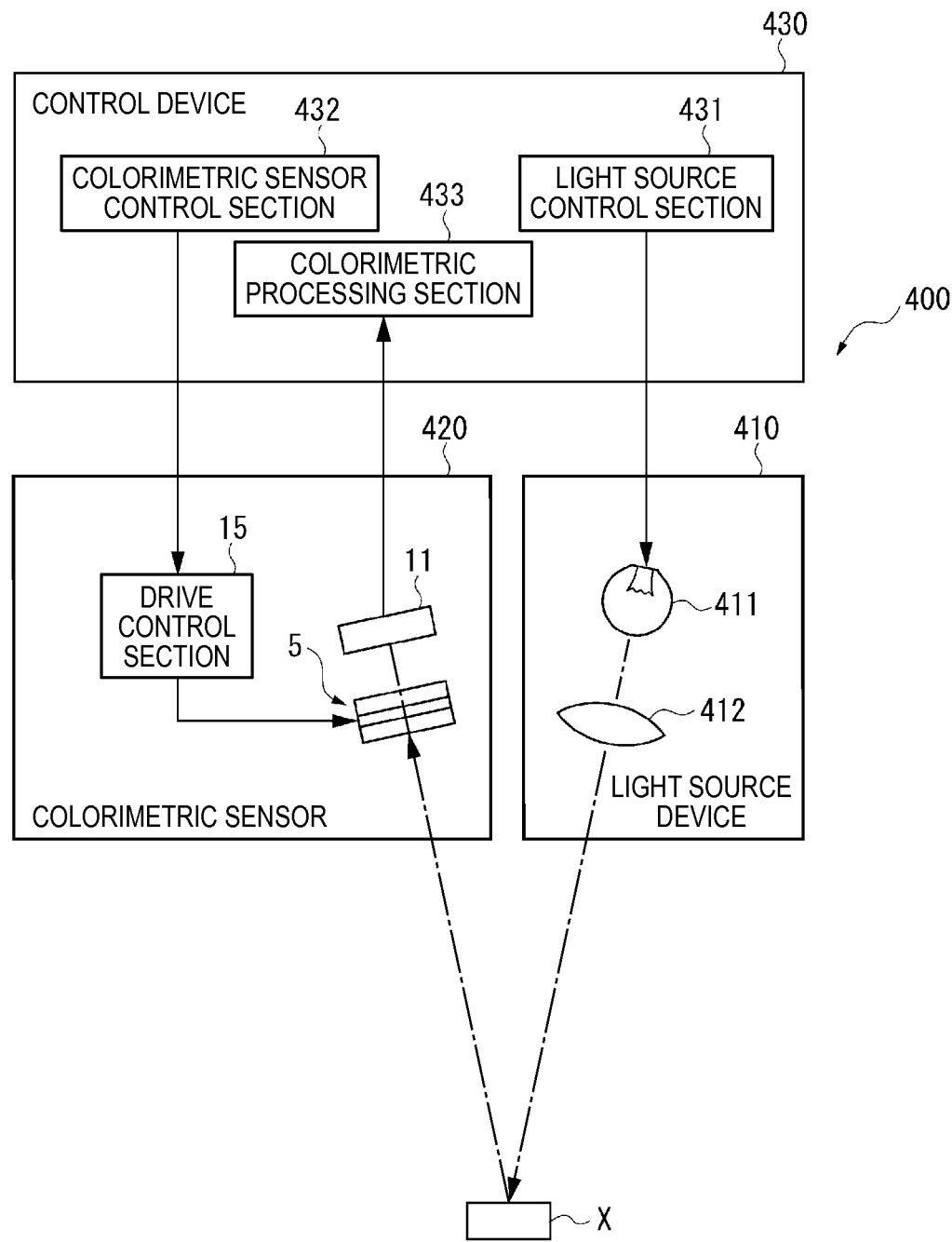
FIG. 11 is a block diagram showing a schematic configuration of a colorimetric device as an example of an electronic apparatus according to the invention.

For example, as shown in FIG. 11, it is also possible to apply the electronic apparatus to a colorimetric device for measuring colors.

FIG. 11 is a block diagram showing an example of the colorimetric device 400 equipped with the variable wavelength interference filter.

As shown in FIG. 11, the colorimetric device 400 is provided with a light source device 410 for emitting light to the measurement object X, a colorimetric sensor 420 (an optical module), and a control device 430 for controlling an overall operation of the colorimetric device 400. Further, the colorimetric device 400 is a device for making the light, which is emitted from the light source device 410, be reflected by the measurement object X, receiving the test target light thus reflected using the colorimetric sensor 420, and analyzing and then measuring the chromaticity of the test target light, namely the color of the measurement object X, based on the detection signal output from the colorimetric sensor 420.

The light source device 410 is provided with alight source 411 and a plurality of lenses 412 (one of the lenses is shown alone in FIG. 11), and emits, for example, reference light (e.g., white light) to the measurement object X. Further, it is possible for the plurality of lenses 412 to include a collimator lens, and in this case, the light source device 410 converts the reference light emitted from the light source 411 into parallel light with the collimator lens, and then emits it from the projection lens not shown toward the measurement object X. It should be noted that although in the present embodiment the colorimetric device 400 provided with the light source device 410 is described as an example, in the case in which, for example, the measurement object X is a light emitting member such as a liquid crystal panel, it is also possible to adopt a configuration not provided with the light source device 410.

The colorimetric sensor 420 is the optical module according to an embodiment of the invention, and is provided with the variable wavelength interference filter 5, the detector 11 for receiving the light transmitted through the variable wavelength interference filter 5, and the drive control section 15 for varying the wavelength of the light to be transmitted through the variable wavelength interference filter 5 as shown in FIG. 11. Further, the colorimetric sensor 420 is provided with an entrance optical lens not shown disposed at a position opposed to the variable wavelength interference filter 5, the entrance optical lens guiding the reflected light (the test target light), which has been reflected by the measurement object X, into the inside thereof. Further, the colorimetric sensor 420 disperses the light with a predetermined wavelength out of the test target light input from the incident optical lens using the variable wavelength interference filter 5, and then receives the light thus dispersed using the detector 11. It should be noted that it is also possible to adopt a configuration in which the optical filter device 600 is disposed instead of the variable wavelength interference filter 5.

The control device 430 controls an overall operation of the colorimetric device 400.

As the control device 430, a general-purpose personal computer, a handheld terminal, a colorimetry-dedicated computer, and so on can be used. Further, as shown in FIG. 11, the control device 430 is configured including a light source control section 431, a colorimetric sensor control section 432, a colorimetric processing section 433, and so on.

The light source control section 431 is connected to the light source device 410, and outputs a predetermined control signal to the light source device 410 based on, for example, a setting input by the user to thereby make the light source device 410 emit white light with a predetermined brightness.

The colorimetric sensor control section 432 is connected to the colorimetric sensor 420, and sets the wavelength of the light to be received by the colorimetric sensor 420 based on, for example, the setting input by the user, and then outputs the control signal instructing to detect the intensity of the received light with the present wavelength to the colorimetric sensor 420. Thus, the drive control section 15 of the colorimetric sensor 420 applies the voltage to the electrostatic actuator 56 based on the control signal to thereby drive the variable wavelength interference filter 5.

The colorimetric processing section 433 analyzes the chromaticity of the measurement object X based on the received light intensity detected by the detector 11.

Further, as another example of the electronic apparatus, there can be cited an optical-base system for detecting presence of a specific material. As an example of such a system, there can be cited, for example, an in-car gas leak detector adopting a spectroscopic measurement method using the optical module according to an embodiment of the invention and detecting a specific gas with high sensitivity, and a gas detection device such as an optoacoustic noble-gas detector for a breath test.

An example of such a gas detection device will hereinafter be explained with reference to the accompanying drawings.

Figure 12:
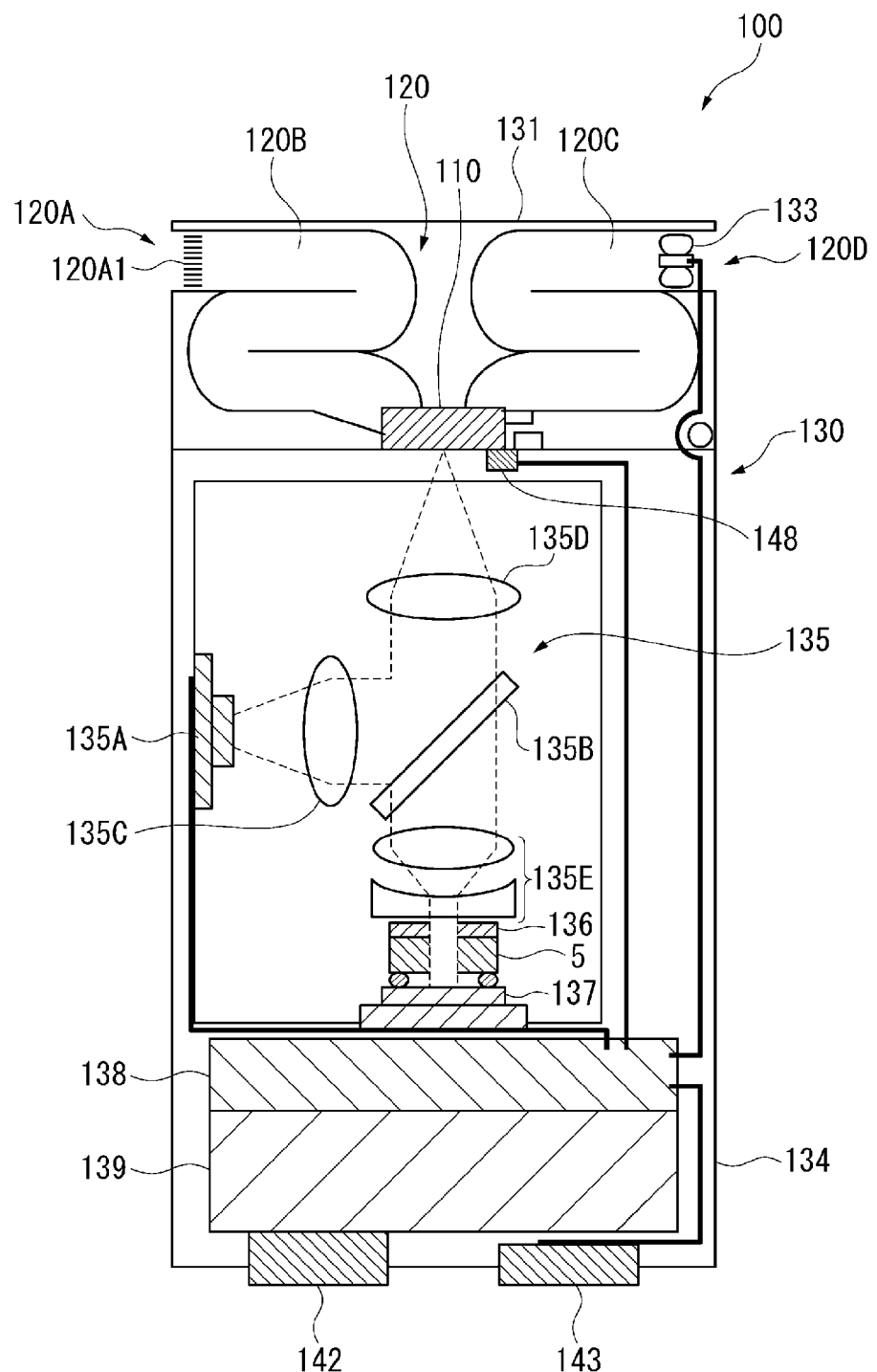
FIG. 12 is a schematic diagram of a gas detection device as another example of the electronic apparatus according to the invention.

FIG. 12 is a schematic diagram showing an example of a gas detection device equipped with the optical module according to the invention.

Figure 13:
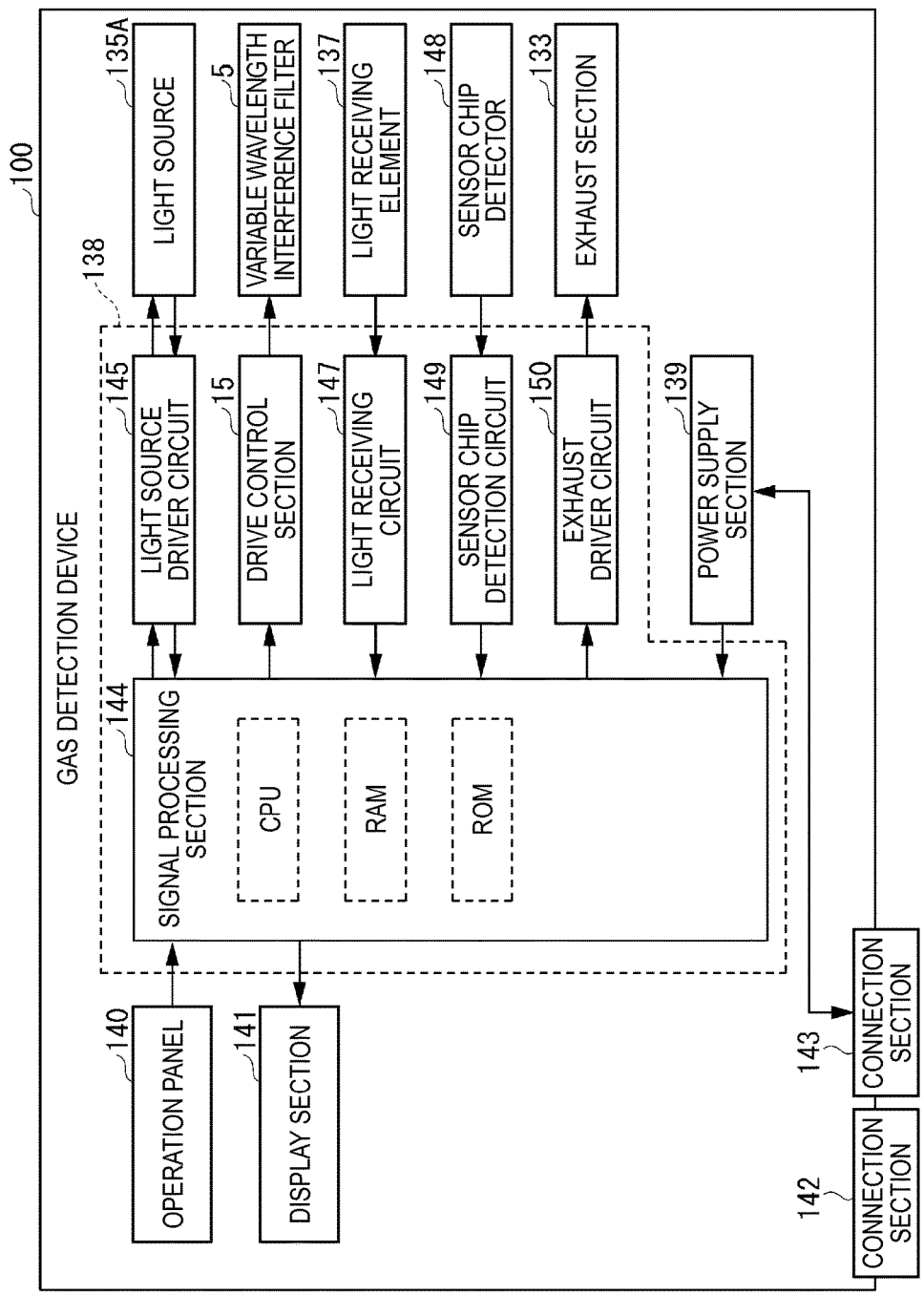
FIG. 13 is a block diagram showing a control system of the gas detection device shown in FIG. 12.

FIG. 13 is a block diagram showing a configuration of a control system of the gas detection device shown in FIG. 12.

As shown in FIG. 12, the gas detection device 100 is configured including a sensor chip 110, a channel 120 provided with a suction port 120A, a suction channel 120B, an exhaust channel 120C, and an exhaust port 120D, and a main body section 130.

The main body section 130 is composed of a detection device (an optical module) including a sensor section cover 131 having an opening to which the channel 120 is detachably attached, an exhaust section 133, a housing 134, an optical section 135, a filter 136, the variable wavelength interference filter 5, a light receiving element 137 (a light receiving section), and so on, a control section 138 (a processing section) for performing processing of the signal output in accordance with the light received by the light receiving element 137 and control of the detection device and the light source section, a power supply section 139 for supplying electrical power, and so on. It should be noted that it is also possible to adopt a configuration in which the optical filter device 600 is disposed instead of the variable wavelength interference filter 5. Further, the optical section 135 includes a light source 135A for emitting light, a beam splitter 135B for reflecting the light, which is input from the light source 135A, toward the sensor chip 110, and transmitting the light, which is input from the sensor chip side, toward the light receiving element 137, and lenses 135C, 135D, and 135E.

Further, as shown in FIG. 13, on the surface of the gas detection device 100, there are disposed an operation panel 140, a display section 141, a connection section 142 for an interface with an external device, and the power supply section 139. In the case in which the power supply section 139 is a secondary battery, a connection section 143 for the battery charge can also be provided.

Further, as shown in FIG. 13, the control section 138 of the gas detection device 100 is provided with a signal processing section 144 composed of a CPU and so on, a light source driver circuit 145 for controlling the light source 135A, the drive control section 15 for controlling the variable wavelength interference filter 5, a light receiving circuit 147 for receiving the signal from the light receiving element 137, a sensor chip detection circuit 149 for receiving the signal from a sensor chip detector 148 for reading a code of the sensor chip 110 to thereby detect presence or absence of the sensor chip 110, an exhaust driver circuit 150 for controlling the exhaust section 133, and so on.

Next, an operation of such a gas detection device 100 as described above will hereinafter be explained.

The sensor chip detector 148 is disposed inside the sensor section cover 131 in the upper part of the main body section 130, and the sensor chip detector 148 detects the presence or absence of the sensor chip 110. When detecting the detection signal from the sensor chip detector 148, the signal processing section 144 determines that it is the condition in which the sensor chip 110 is attached, and outputs a display signal for displaying the fact that the detection operation can be performed to the display section 141.

Then, in the case in which, for example, the user operates the operation panel 140, and the operation panel 140 outputs an instruction signal indicating that the detection process will be started to the signal processing section 144, the signal processing section 144 firstly outputs the signal for operating the light source to the light source driver circuit 145 to thereby operate the light source 135A. When the light source 135A is driven, the light source 135A emits a stable laser beam, which has a single wavelength and is a linearly polarized light. Further, the light source 135A incorporates a temperature sensor and a light intensity sensor, and the information of the sensors is output to the signal processing section 144. Then, if the signal processing section 144 determines that the light source 135A is operating stably based on the information of the temperature and the light intensity input from the light source 135A, the signal processing section 144 controls the exhaust driver circuit 150 to operate the exhaust section 133. Thus, the gaseous sample including the target material (the gas molecule) to be detected is guided from the suction port 120A to the suction channel 120B, the inside of the sensor chip 110, the exhaust channel 120C, and the exhaust port 120D. It should be noted that the suction port 120A is provided with a dust filter 120A1, and relatively large dust, some water vapor, and so on are removed.

Further, the sensor chip 110 is a sensor incorporating a plurality of sets of metal nano-structures, and using localized surface plasmon resonance. In such a sensor chip 110, an enhanced electric field is formed between the metal nano-structures due to the laser beam, and when the gas molecules enter the enhanced electric field, the Raman scattered light including the information of the molecular vibration, and the Rayleigh scattered light are generated.

The Rayleigh scattered light and the Raman scattered light pass through the optical section 135 and then enter the filter 136, and the Rayleigh scattered light is separated out by the filter 136, and the Raman scattered light enters the variable wavelength interference filter 5. Then, the signal processing section 144 outputs a control signal to the drive control section 15. Thus, the drive control section 15 drives the electrostatic actuator 56 of the variable wavelength interference filter 5 in a similar manner to the first embodiment described above to make the variable wavelength interference filter 5 disperse the Raman scattered light corresponding to the gas molecules to be the detection target. Subsequently, when the light thus dispersed is received by the light receiving element 137, the light reception signal corresponding to the received light intensity is output to the signal processing section 144 via the light receiving circuit 147. On this occasion, the Raman scattered light to be the target can accurately be taken out from the variable wavelength interference filter 5.

The signal processing section 144 compares the spectrum data of the Raman scattered light corresponding to the gas molecule to be the detection target obtained in such a manner as described above and the data stored in the ROM with each other to thereby determine whether or not the gas molecule is the target one, and thus identifies the substance. Further, the signal processing section 144 makes the display section 141 display the result information, or outputs the result information from the connection section 142 to the outside.

It should be noted that although in FIGS. 12 and 13 there is exemplified the gas detection device 100 for dispersing the Raman scattered light with the variable wavelength interference filter 5, and performing the gas detection based on the Raman scattered light thus dispersed, a gas detection device for identifying the gas type by detecting the absorbance unique to the gas can also be used. In this case, the gas sensor, which makes the gas flow into the sensor, and detects the light absorbed by the gas out of the incident light, is used as the optical module. Further, the gas detection device for analyzing and determining the gas flowing into the sensor using such a gas sensor is cited as the electronic apparatus. According also to such a configuration, it is possible to detect the component of the gas using the variable wavelength interference filter.

Further, as the system for detecting the presence of the specific substance, besides the gas detection described above, there can be cited a substance component analysis device such as a non-invasive measurement device of a sugar group using near-infrared dispersion, and a non-invasive measurement device of information of food, biological object, or mineral.

Hereinafter, a food analysis device will be explained as an example of the substance component analysis device described above.

Figure 14:
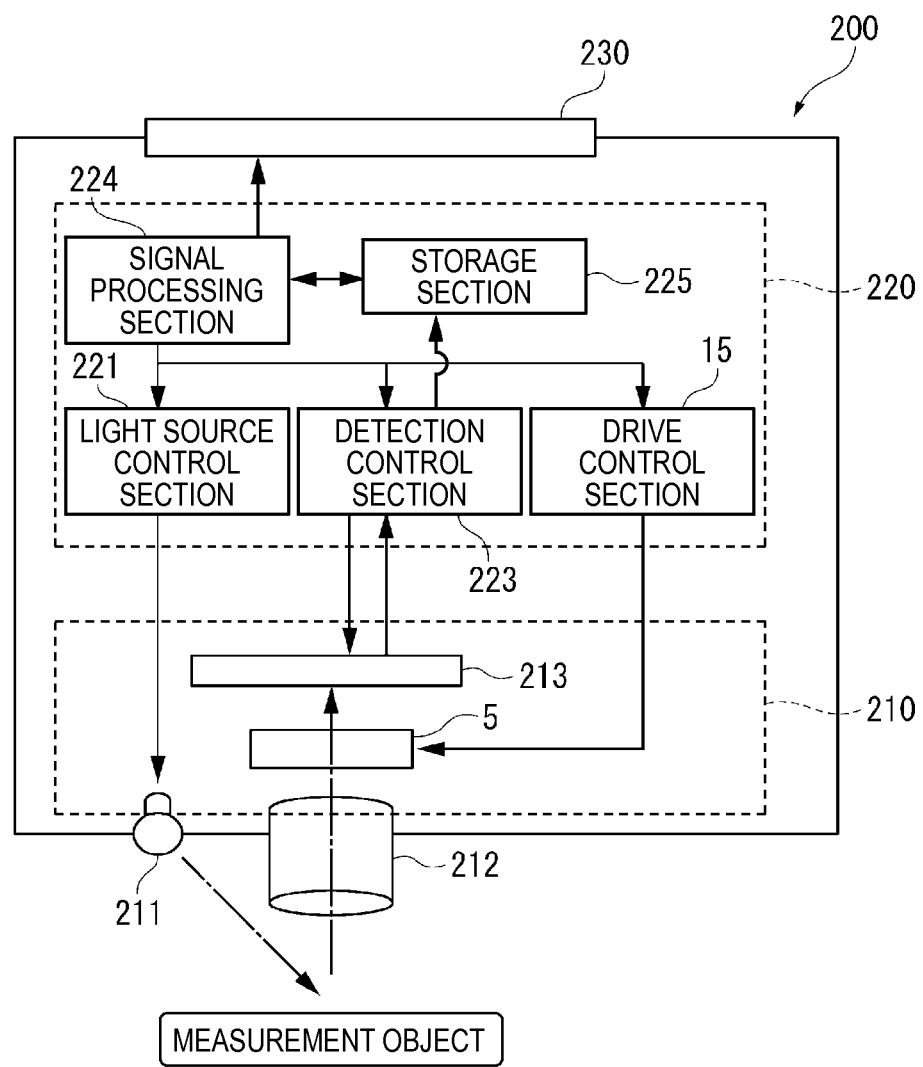
FIG. 14 is a block diagram showing a schematic configuration of a food analysis device as another example of the electronic apparatus according to the invention.

FIG. 14 is a diagram showing a schematic configuration of the food analysis device as an example of the electronic apparatus using the optical module according to the invention.

As shown in FIG. 14, the food analysis device 200 is provided with a detector 210 (the optical module), a control section 220, and a display section 230. The detector 210 is provided with a light source 211 for emitting light, an image pickup lens 212 to which the light from a measurement object is introduced, the variable wavelength interference filter 5 for dispersing the light thus introduced from the image pickup lens 212, and an image pickup section 213 (a light receiving section) for detecting the light thus dispersed. It should be noted that it is also possible to adopt a configuration in which the optical filter device 600 is disposed instead of the variable wavelength interference filter 5.

Further, the control section 220 is provided with a light source control section 221 for performing lighting/extinction control of the light source 211 and brightness control of the light source in the lighting state, the drive control section 15 for controlling the variable wavelength interference filter 5, a detection control section 223 for controlling the image pickup section 213 and obtaining a spectral image taken by the image pickup section 213, a signal processing section 224, and a storage section 225.

In the food analysis device 200, when the system is started up, the light source control section 221 controls the light source 211, and the light source 211 irradiates the measurement object with the light. Then, the light reflected by the measurement object passes through the image pickup lens 212 and then enters the variable wavelength interference filter 5. The variable wavelength interference filter 5 is driven with the driving method described in the first embodiment under the control by the drive control section 15. Thus, the light with the target wavelength can accurately be taken out from the variable wavelength interference filter 5. Then, the light thus taken out is imaged by the image pickup section 213 formed of, for example, a CCD camera. Further, the light thus imaged is stored in the storage section 225 as the spectral image. Further, the signal processing section 224 controls the drive control section 15 to vary the voltage value to be applied to the variable wavelength interference filter 5 to thereby obtain the spectral image corresponding to each wavelength.

Then, the signal processing section 224 performs an arithmetic process on the data of each pixel in each of the images stored in the storage section 225 to thereby obtain the spectrum in each pixel. Further, the storage section 225 stores, for example, information related to a component of food corresponding to the spectrum, and the signal processing section 224 analyzes the data of the spectrum thus obtained based on the information related to the food stored in the storage section 225, and then obtains the food component and the content thereof included in the detection object. Further, the calorie of the food, the freshness thereof, and so on can also be calculated based on the food components and the contents thus obtained. Further, by analyzing the spectral distribution in the image, it is possible to perform extraction of the portion with low freshness in the food as a test object, and further, it is also possible to perform detection of a foreign matter or the like included in the food.

Then, the signal processing section 224 performs a process of making the display section 230 display the information of the components, the contents, the calorie, the freshness, and so on of the food as the test object obtained in such a manner as described above.

Further, although the example of the food analysis device 200 is shown in FIG. 14, it is also possible to use substantially the same configuration as such a non-invasive measurement device of other information as described above. For example, the configuration can be used as a biological analysis device for performing analysis of a biological component such as measurement and analysis of a biological fluid such as blood. If a device of detecting ethyl alcohol is cited as a device for measuring the biological fluid component such as blood, such a biological analysis device can be used as a device for detecting the influence of alcohol to the driver to thereby prevent driving under the influence of alcohol. Further, the configuration can also be used as an electronic endoscopic system equipped with such a biological analysis device.

Further, the configuration can also be used as a mineral analysis device for performing component analysis of minerals.

Further, the optical module and the electronic apparatus can be applied to the following devices.

For example, it is also possible to transmit data with the light having each of the wavelengths by temporally varying the intensity of the light having each of the wavelengths, and in this case, it is possible to extract the data transmitted with the light having a specific wavelength by dispersing the light having the specific wavelength using the variable wavelength interference filter provided to the optical module, and then making the light receiving section receive the light. Therefore, by processing the data in the light having each of the wavelengths using the electronic apparatus equipped with such a data extracting optical module, it is also possible to perform optical communication.

Further, the electronic apparatus can be applied to a spectroscopic camera for picking up the spectral image and a spectroscopic analysis device by dispersing the light with the optical module. As an example of such a spectroscopic camera, an infrared camera incorporating the variable wavelength interference filter can be cited.

Figure 15:
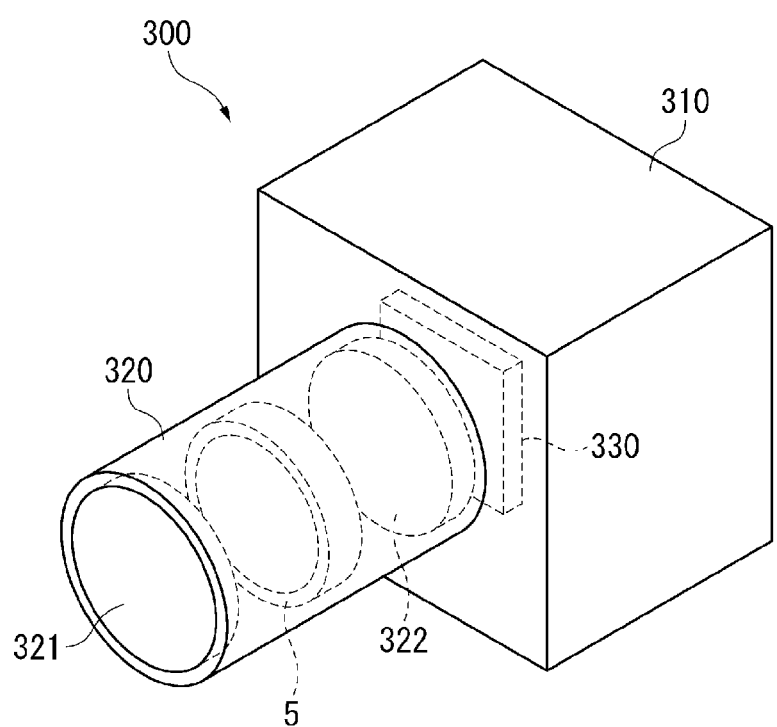
FIG. 15 is a schematic diagram showing a schematic configuration of a spectroscopic camera as another example of the electronic apparatus according to the invention.

FIG. 15 is a schematic diagram showing a schematic configuration of the spectroscopic camera. As shown in FIG. 15, the spectroscopic camera 300 is provided with a camera main body 310, an image pickup lens unit 320, and an image pickup section 330.

The camera main boy 310 is a part to be gripped and operated by the user.

The image pickup lens unit 320 is provided to the camera main body 310, and guides the image light input thereto to the image pickup section 330. Further, as shown in FIG. 15, the image pickup lens unit 320 is configured including an objective lens 321, an imaging lens 322, and the variable wavelength interference filter 5 disposed between these lenses. It should be noted that it is also possible to adopt a configuration in which the optical filter device 600 is disposed instead of the variable wavelength interference filter 5.

The image pickup section 330 is formed of a light receiving element, and takes the image of the image light guided by the image pickup lens unit 320.

In such a spectroscopic camera 300, by transmitting the light with the wavelength to be the imaging object using the variable wavelength interference filter 5, the spectral image of the light with a desired wavelength can be taken.

Further, the optical module can be used as a band-pass filter, and can also be used as, for example, an optical laser device for dispersing and transmitting only the light with a wavelength in a narrow band centered on a predetermined wavelength out of the light in a predetermined wavelength band emitted by the light emitting element using the variable wavelength interference filter.

Further, the optical module can also be used as a biometric authentication device, and can be applied to, for example, an authentication device of blood vessels, a fingerprint, a retina, an iris, and so on using the light in a near infrared range or a visible range.

Further, the optical module and the electronic apparatus can be used as a concentration detection device. In this case, the infrared energy (the infrared light) emitted from the substance is dispersed by the variable wavelength interference filter and is then analyzed, and the concentration of the test object in a sample is measured.

As described above, the optical module and the electronic apparatus can be applied to any device for dispersing predetermined light from the incident light. Further, since the optical module can disperse the light into a plurality of wavelength components with a single device as described above, the measurement of the spectrum of a plurality of wavelengths and detection of a plurality of components can be performed with accuracy. Therefore, compared to the related-art device of taking out desired wavelengths with a plurality of devices, miniaturization of the optical module and the electronic apparatus can be promoted, and the optical module and the electronic apparatus can preferably be used as, for example, a portable or in-car optical device.

Besides the above, a specific structure to be adopted when putting the invention into practice can be replaced with another structure and so on within the range in which the advantages of the invention can be achieved.

The entire disclosure of Japanese Patent Application No. 2013-201047 filed on Sep. 27, 2013 is expressly incorporated by reference herein.

What is claimed is:

1. An interference filter comprising:
   a substrate;
   a second substrate opposed to the substrate;
   a first reflecting film disposed on one surface of the substrate, the first reflecting film being formed of a plurality of layers;
   a second reflecting film opposed to the substrate, the second substrate being provided with the second reflecting film, and the second reflecting film being formed of a plurality of layers;
   an electrode disposed on the first reflecting film; and
   a second electrode is disposed on the second reflecting film,
   wherein the first reflecting film includes a first region facing the second reflecting film, and a second region in an area extending from the first region to an outer circumferential edge of the substrate;
   wherein the second reflecting film occupies a region of the second substrate opposed to the first reflecting film, and extends from the region to an outer circumferential edge of the second substrate; and
   wherein the first region is an optical interference region, and the electrode overlaps the optical interference region.

2. The interference filter according to claim 1, wherein the first reflecting film is spaced apart from the second reflecting film by a predetermined gap, and
   the electrode is provided with:
      a mirror electrode having a light transmissive property and overlapping part of the first region, and
      a mirror connection electrode extending from an outer circumferential edge of the mirror electrode to a predetermined position of the first reflecting film and outside the first region in a plan view.

3. The interference filter according to claim 1, further comprising:
   a stress-canceling film adapted to cancel out a film stress of the first reflecting film, the stress-canceling film being disposed on a second surface of the substrate opposite to the one surface on which the first reflecting film is disposed, and overlapping the first reflecting film in a plan view.

4. The interference filter according to claim 3, wherein the stress-canceling film comprises an antireflection film.

5. The interference filter according to claim 1, wherein the second reflecting film is spaced apart from the first reflecting film by a predetermined gap, and
   the second electrode is provided with:
      a second mirror electrode having a light transmissive property and overlapping a part of the second region, and
      a second mirror connection electrode extending from an outer circumferential edge of the second mirror electrode to a predetermined position of the second reflecting film and outside the second region in a plan view.

6. The interference filter according to claim 1, wherein the first reflecting film includes a first region facing the second reflecting film across a predetermined gap, the second reflecting film includes a second region facing the first region across the predetermined gap,
   the electrode is provided with a first drive electrode disposed outside the first region, and a first drive connection electrode extending from an outer circumferential edge of the first drive electrode to a predetermined position of the first reflecting mirror outside the first region in a plan view, and
   the second electrode is provided with a second drive electrode disposed outside the second region, and a second drive connection electrode extending from an outer circumferential edge of the second drive electrode to a predetermined position of the second reflecting mirror outside the second region in a plan view.

7. The interference filter according to claim 1, further comprising:
   a second stress-canceling film adapted to cancel out a film stress of the second reflecting film, the second stress-canceling film being disposed on a surface of the second substrate facing away from the substrate, and overlapping the second reflecting film in a plan view.

8. The interference filter according to claim 7, wherein the second stress-canceling film comprises an antireflection film.

9. The interference filter according to claim 1, wherein the first reflecting film and the second reflecting film each comprise a multilayer film having high refractive index layers and low refractive index layers alternately stacked on each other.

10. An optical module comprising:
    the interference filter of claim 1; and
    a light receiving section receiving light emitted from the interference filter.

11. An electronic apparatus comprising:
    the interference filter of claim 1; and
    a control section controlling the interference filter.

12. The interference filter according to claim 1, wherein the electrode entirely overlaps the optical interference region.

13. An optical filter device comprising:
    an interference filter including:
       a substrate,
       a second substrate opposed to the substrate,
       a first reflecting film disposed on one surface of the substrate, the first reflecting film being formed of a plurality of layers,
       a second reflecting film opposed to the substrate, the second substrate being provided with the second reflecting film, and the second reflecting film being formed of a plurality of layers,
       an electrode disposed on the first reflecting film, and
       a second electrode is disposed on the second reflecting film,
       wherein the first reflecting film includes a first region facing the second reflecting film, and a second region in an area extending from the first region to an outer circumferential edge of the substrate;
       wherein the first region is an optical interference region, and the electrode overlaps the optical interference region; and
       wherein the second reflecting film occupies a region of the second substrate opposed to the first reflecting film, and extends from the region to an outer circumferential edge of the second substrate, and
    a housing holding the interference filter.

14. The optical filter according to claim 13, wherein the electrode entirely overlaps the optical interference region.

15. An interference filter comprising:
a stationary substrate;
a movable substrate opposed to the stationary substrate;
a stationary reflecting film disposed on an entire surface of the stationary substrate facing the movable substrate, the stationary reflecting film being a multilayer film;
a movable reflecting film disposed on an entire surface of the movable substrate and facing the stationary reflecting film, the movable reflecting film being a multilayer film;
a mirror electrode disposed on part of the stationary reflecting film; and
a mirror electrode disposed on part of the movable reflecting film; and
wherein the first mirror electrode is disposed on the stationary reflecting film in an optical interference region where the stationary reflective film is overlapped by the mirror electrode disposed on part of the movable reflecting film.

16. The interference filter according to claim 15, further comprising:
a stress-canceling film adapted to cancel out a film stress of the stationary reflecting film, the stress-canceling film being disposed on a second surface of the stationary substrate opposite to the surface on which the stationary reflecting film is disposed, and overlapping the stationary reflecting film in a plan view.

17. The interference filter according to claim 16, wherein the stress-canceling film comprises an antireflection film.

18. The interference filter according to claim 15, wherein the first mirror electrode is disposed on an entirety of the stationary reflecting film in the optical interference region.

* * * * *